US009720760B2

(12) United States Patent
Paulraj et al.

(10) Patent No.: US 9,720,760 B2
(45) Date of Patent: Aug. 1, 2017

(54) MITIGATING WIRELESS NETWORKING PROBLEMS OF A WIRELESS NETWORK

(71) Applicant: Aruba Networks, Inc., Sunnyvale, CA (US)

(72) Inventors: Arogyaswami Paulraj, Stanford, CA (US); Bernd Bandemer, Palo Alto, CA (US); Jose Tellado, Mountain View, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 74 days.

(21) Appl. No.: 14/720,755

(22) Filed: May 23, 2015

(65) Prior Publication Data

US 2016/0266954 A1 Sep. 15, 2016

Related U.S. Application Data

(63) Continuation-in-part of application No. 14/643,332, filed on Mar. 10, 2015.

(51) Int. Cl.
*H04W 4/00* (2009.01)
*G06F 11/07* (2006.01)
*H04W 24/04* (2009.01)

(52) U.S. Cl.
CPC ........ *G06F 11/079* (2013.01); *G06F 11/0709* (2013.01); *H04W 24/04* (2013.01)

(58) Field of Classification Search
CPC ... H04W 24/04; G06F 11/079; G06F 11/0709
USPC ........................................................ 370/338
See application file for complete search history.

(56) References Cited

U.S. PATENT DOCUMENTS

| | | | |
|---|---|---|---|
| 7,177,311 B1 | 2/2007 | Hussain et al. | |
| 7,456,596 B2 | 11/2008 | Goodall et al. | |
| 7,460,837 B2 | 12/2008 | Diener | |
| 8,022,822 B2 | 9/2011 | Liang et al. | |
| 8,386,593 B1 * | 2/2013 | Gao | H04L 41/085 709/223 |
| 9,203,563 B2 | 12/2015 | Etemad et al. | |
| 2005/0078968 A1 * | 4/2005 | Ohta | G03G 15/5016 399/8 |

(Continued)

OTHER PUBLICATIONS

Tellado, J., et al.; "Non-Final Office Action cited in U.S. Appl. No. 14/643,332"; mailed Sep. 7, 2016; 16 pages.

*Primary Examiner* — Sai-Ming Chan
(74) *Attorney, Agent, or Firm* — Brooks, Cameron & Huebsch, PLLC

(57) ABSTRACT

Systems, methods and apparatuses for mitigating a wireless networking problem of a wireless network are disclosed. One method includes determining, by an analytics engine, a problem associated with the wireless network, wherein the analytics engine is operative as a central intelligence for detection, analyzing, classifying, root-causing, or controlling the wireless network. The method further includes receiving, by the analytics engine, a collected user input and state information, mapping, by at least the analytics engine, a problem signature of the user input and the state information to at least one of a number of possible problem network conditions, determining, by the analytics engine, instructions for alleviating the problem based on the mapping of the problem signature, and providing, by the analytics engine, the instructions.

26 Claims, 16 Drawing Sheets

(56) References Cited

U.S. PATENT DOCUMENTS

| | | |
|---|---|---|
| 2008/0086236 A1 | 4/2008 | Saito |
| 2008/0151761 A1 | 6/2008 | Theisen et al. |
| 2008/0151762 A1 | 6/2008 | Armstrong et al. |
| 2008/0267145 A1 | 10/2008 | Vangati |
| 2009/0097468 A1 | 4/2009 | Yi et al. |
| 2009/0254216 A1 | 10/2009 | Matsushima |
| 2009/0260083 A1 | 10/2009 | Szeto et al. |
| 2009/0328219 A1 | 12/2009 | Narayanaswamy |
| 2010/0030417 A1 | 2/2010 | Fang |
| 2011/0188415 A1 | 8/2011 | Graziano |
| 2011/0252079 A1* | 10/2011 | Werner ............... H04L 29/125 709/202 |
| 2012/0250546 A1 | 10/2012 | Hamida et al. |
| 2013/0084984 A1 | 4/2013 | Gagner |
| 2013/0227689 A1 | 8/2013 | Pietrowicz |
| 2013/0316738 A1 | 11/2013 | Noonan |
| 2014/0159729 A1 | 6/2014 | Olsson et al. |
| 2014/0253295 A1 | 9/2014 | Roberts |
| 2015/0015895 A1 | 1/2015 | Bridges et al. |
| 2015/0032258 A1 | 1/2015 | Passot et al. |
| 2015/0094852 A1 | 4/2015 | Laurent et al. |
| 2016/0037559 A1 | 2/2016 | Malik et al. |

\* cited by examiner

Determining, by an analytics engine, a problem associated with the wireless network, wherein the analytics engine is operative as a central intelligence for detection, analyzing, classifying, root-causing, or controlling the wireless network

1010

Receiving, by the analytics engine, a collected user input and state information

1020

Mapping, by at least the analytics engine, a problem signature of the user input and the state information to at least one of a number of possible problem network conditions

1030

Determining, by the analytics engine, instructions for alleviating the problem based on the mapping of the problem signature

1040

Providing, by the analytics engine, the instructions

Obtaining, by a network service engine, a plurality of link quality signatures, wherein each of the plurality of link quality signatures includes link qualities between a network node and a plurality of network sensors

1510

Estimating, by the network service engine, link qualities between a plurality of network nodes based on the plurality of link quality signatures and a network estimation model.

MITIGATING WIRELESS NETWORKING PROBLEMS OF A WIRELESS NETWORK

RELATED APPLICATIONS

This patent application is a continuation-in-part (CIP) of U.S. patent application Ser. No. 14/643,332, filed Mar. 10, 2015, which is herein incorporated by reference.

FIELD OF THE DESCRIBED EMBODIMENTS

The described embodiments relate generally to wireless communications. More particularly, the described embodiments relate to systems, methods and apparatuses for mitigating wireless networking problems of a wireless network.

BACKGROUND

Wireless networks are being widely deployed due to the convenience of tether less communications. Wireless networks have been witnessing increasing capacity/data rates, coverage and seamless connectivity. Wireless networks span wide area including satellite networks to wide area mobile networks to local area WiFi (Wireless Fidelity) to restricted (room) or personal area networks. These WiFi networks offer a low cost way of achieving high data throughput rates. Some of these networks, such as cellular, use licensed frequency bands, while others operate in unlicensed bands. More recently, more complex ways of band sharing have also been introduced. Due to the nature of wireless propagation and the complex protocols used in transmission and access, wireless networks often show a range of problems from simple inability to connect to the network to poor throughput performance.

Such problems are particularly evident in Wi-Fi networks that use Carrier Sense, Multiple Access with Collision avoidance (CSMA/CA) mechanisms to regulate transmissions. Briefly, each wireless network end device detects if the medium is being used; if so, the end device waits a random amount of time before trying to transmit again. This method of contending for the medium is simple, intrinsically fair, and requires no central scheduling. However, in the case of densely deployed Wi-Fi networks, this method of communication has a number of shortcomings, which include co-located Wi-Fi devices contending for the medium back-off to one another, leading to wasted time when the channel is idle. Further, co-located Wi-Fi devices that pick the same back-off time cause packets to collide over-the-air, leading to packet loss and reduced throughput. Further, end device vendors implement proprietary algorithms (e.g., for roaming) that lead to sub-optimal network performance. Further, end devices expose limited control (e.g., to schedule transmissions) for the network to optimize their performance. Further, legacy (802.11a/b/g) end devices reduce overall network throughput because they use much lower speeds and hence occupy the medium for longer time periods. Further, since WiFi uses unlicensed bands shared by other non-WiFi devices which do not follow WiFi protocols, they can cause increased contention and packet loss in Wi-Fi networks. A number of anomalies can result in wireless networks that can be hard to detect, difficult diagnose and complex to fix. Such anomalies can range from inability to connect or reconnect, poor or intermittent throughput, which we describe as poor user experience. Poor user experience increases operations cost, poor customer or user satisfaction.

It is desirable to have systems, methods and apparatuses for mitigating wireless networking problems of a wireless network.

SUMMARY

An embodiment includes a method of mitigating a wireless networking problem of a wireless network. The method includes determining, by an analytics engine, a problem associated with the wireless network, wherein the analytics engine is operative as a central intelligence for detection, analyzing, classifying, root-causing, or controlling the wireless network. The method further includes receiving, by the analytics engine, a collected user input and state information, mapping, by at least the analytics engine, a problem signature of the user input and the state information to at least one of a number of possible problem network conditions, determining, by the analytics engine, instructions for alleviating the problem based on the mapping of the problem signature, and providing, by the analytics engine, the instructions.

An embodiment includes an analytics engine associated with a wireless network. The analytics engine operative to determine a problem associated with the wireless network, wherein the analytics engine is operative as a central intelligence for detection, analyzing, classifying, root-causing, or controlling the wireless network, receive a collected user input and state information, map a problem signature of the user input and the state information to at least one of a number of possible problem network conditions, determine instructions for alleviating the problem based on the mapping of the problem signature, and provide the instructions.

An embodiment includes a wireless network. The wireless network includes a plurality of access points, and a plurality of servers associated with the wireless network. One or more of the plurality of servers includes an analytic engine, wherein the analytics engine is operative as a central intelligence for detection, analyzing, classifying, root-causing, and controlling the wireless network. The analytics engine is operative to determine a problem associated with the wireless network, wherein the analytics engine is operative as a central intelligence for detection, analyzing, classifying, root-causing, or controlling the wireless network, receive a collected user input and state information, map a problem signature of the user input and the state information to at least one of a number of possible problem network conditions, determine instructions for alleviating the problem based on the mapping of the problem signature, and provide the instructions.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 10 is a flow chart that includes steps of a method of mitigating a problem of a wireless mesh network, according to an embodiment.

FIG. 15 is a flow chart that includes steps of method of estimating quality of wireless links between different wireless end devices, according to an embodiment.

DETAILED DESCRIPTION

The described embodiments include methods, apparatuses and system for mitigating problems associated with a wireless network. As least some embodiment includes an analytics engine that determines a problem exists by either receiving an indication that the problem exists, or by detecting that the problem exits. At least some embodiments include a "man-in-the-loop" which includes, for example, a user or a wireless network operator that provides additional input(s) and/or controls for the analytics engine. The analytics engine uses one or more of available resources to characterize the problem and provide actions for mitigating the problem.

Figure 1:
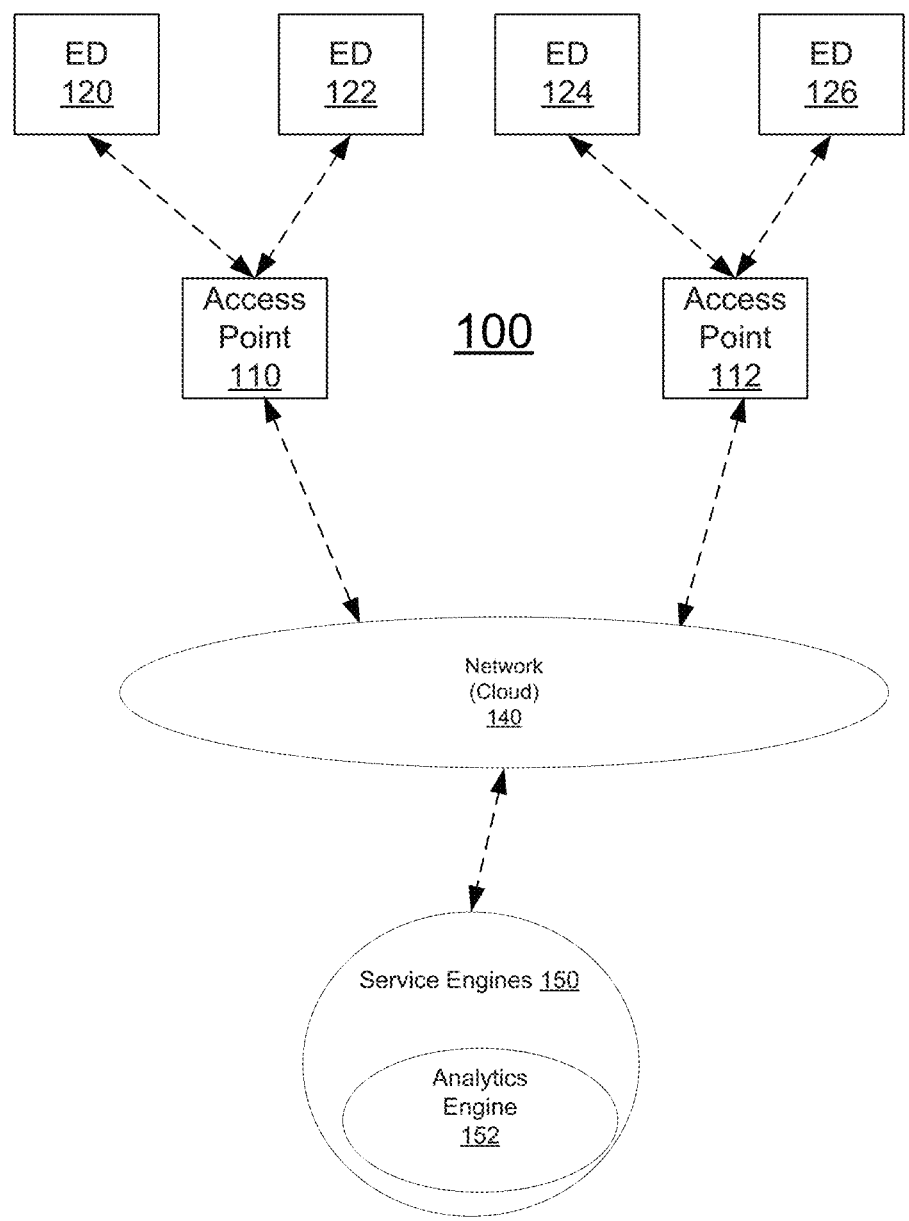
FIG. 1 shows a wireless network that includes an analytic engine operative to mitigate wireless networking problems, according to an embodiment.

FIG. 1 shows a wireless network 100 that includes an analytic engine 152 operative to mitigate wireless networking problems, according to an embodiment. As shown, multiple end devices (ED(s)) 120, 122, 124, 126 are connected to a network 140 through access points 110, 112. For at least some embodiments, the network 140 provides a communication channel between service engines 150 and the ED(s) 120, 122, 124, 126 and the access points 110, 112. For an embodiment, the service engines 150 include the analytics engine 152. While depicted as a single block, it is to be understood that the service engines 150 and the analytics engine 152 are functionally operating units that can be distributed amongst one or more servers or computers that are connectable to the network 140.

For at least some embodiments, the analytics engine 152 is operative as a central intelligence for detection, analyzing, classifying, root-causing, or controlling the wireless network. For an embodiment, the analytics engine 152 mitigates a wireless networking problem of a wireless network.

For an embodiment, the analytics engine 152 determines a problem associated with the wireless network. Exemplary wireless network problems include network performance, and/or network connectivity problems. For an embodiment, the problem associated with the wireless network is determined by the analytics engine detecting the existence of a problem based on the state information. For an embodiment, the problem associated with the wireless network is determined by the analytics engine receiving identification notification of the existence of the problem from a user of a wireless device (for example, end device 120).

For an embodiment, the analytics engine 152 receives collected user input(s) and state information. The collected user input(s) include, for example, answers by the user to multiple choice questions that relate to the nature of the wireless networking problem, numeric input, or binary input (for example, whether a suggested solution did indeed mitigate the problem).

The state information includes, for example, sensor information, or variables read from network elements (not originating from a physical sensor). For an embodiment, the state information includes the entirety of information available at the analytics engine about the network at a certain point of time. For an embodiment, the sensor information includes physical measurements. For an embodiment, the state information includes a protocol state, and other quantities that are not specifically measured, but already present in memory.

For an embodiment, the analytics engine 152 maps a problem signature of the user input and the sensor information to at least one of a number of possible problem network conditions. While the term "signature" is used in the described embodiments, it is to be understood that this term can be generally interpreted as one or more variables (sensed measurements, user inputs) that are related to the problem.

For an embodiment, the problem signature includes at least one of a wireless device type, a type of access point that the wireless device is connected or attempting to connect to, or a network type. For an embodiment, the problem signature includes the wireless network topology. For an embodiment, the problem signature includes configuration data of the access point.

For an embodiment, the problem signature includes a data traffic type. For an embodiment, the problem signature includes measured data traffic transmission rates.

For an embodiment, the problem signature includes at least one of a deployment type, or applications that are currently in use in the network. For an embodiment, the problem signature includes a list of applications obtained from end device.

For at least some embodiments, mapping a problem signature of the user input and the sensor information with at least one of a number of possible problem network conditions includes comparing features of the problem signature with problem characterizations stored in the knowledge database. As previously described, the term "signature" is to be understood generally as one or more variables (sensed measurements, user inputs) that are related to the problem.

For at least some embodiments, the mapping implements an inference, where the nature of the problem is inferred from the problem signature. For an embodiment, the mapping includes applying one or more decision models to the problem signature. For an embodiment, the decision models are constructed based on multiple previously observed problem signatures and the instructions that led to successful mitigation of the problems of the previously observed problem signatures. For an embodiment, the decision models include one or more partitions of the set of possible problem signatures to a finite number of subsets, wherein each of the subsets maps to a particular instruction.

For an embodiment, the one or more partitions are specified by one or more of decision trees, closest neighbor mapping, table lookups, expert systems, probabilistic models of cause and effect.

For an embodiment, the mapping, decision models and/or partitions are constructed from multiple previously observed problem signatures and the instructions that led to their successful mitigation. For an embodiment, the previously observed problem signatures and the instructions that led to their successful mitigation originate from the same wireless network. For another embodiment, the previously observed problem signatures and the instructions that led to their successful mitigation originate from a plurality of wireless networks, wherein one of the plurality of networks is wireless network.

For an embodiment, the mapping, decision models and/or partitions are constructed by an optimization that enhances the probability of successful problem mitigation.

For an embodiment, the analytics engine 152 determines instructions for alleviating the problem based on the mapping of the problem signature.

For an embodiment, the analytics engine provides the instructions. For an embodiment, the instructions includes actions that can be taken to mitigate of eliminate the effects of the problem. For at least some embodiments, the instructions in include one or more of device action, operator action, user action, operator action, and/or equipment update. Exemplary device action includes a transmission channel change, a modification of a wireless transmission parameter, setting modulation and coding, and/or setting a MIMO (multiple-input, multiple-output) mode. Exemplary user action includes changing a device location, changing an application setting and/or executing a test. Exemplary operator action includes changing a device configuration, changing a network configuration, and/or rebooting a network component. Exemplary equipment modification and update include adding an additional access point and/or repositioning an access point. It is to be understood that these list are exemplary and that many other such actions may be utilized.

Figure 2:
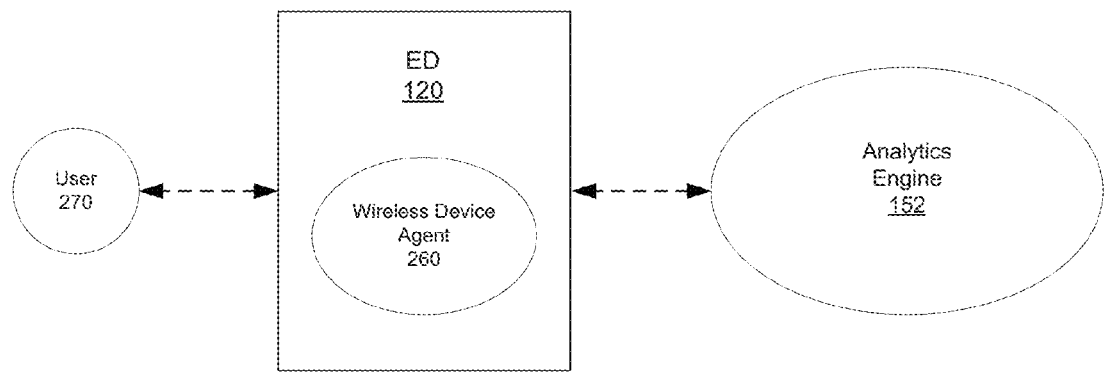
FIG. 2 shows an analytics engine interfaced with a wireless device agent of an end device, according to an embodiment.

FIG. 2 shows an analytics engine 152 interfaced with a wireless device agent 260 of an end device 120, according to an embodiment. For at least some embodiments, the analytics engine 152 activates the wireless device agent 260 of the end (wireless) device 120. For at least some embodiments a communication channel is established between the wireless device agent 260 and the analytics engine 152, and wherein the wireless device agent 260 is operative to interpret commands of a user 270 of the wireless device 120, display information to the user 270, and interface with hardware operations of the wireless device 120. Further, the wireless device agent 260 collects the user inputs. Further, for at least some embodiments, the wireless device agent 260 collects sensor information of the wireless device 120. The user inputs and the collected sensor information is feedback to the analytics engine 152, and can be used to diagnose and provide actions for mitigating the problem.

For at least some embodiments, the analytics engine 152 provides the instructions to the wireless device agent 260, and further the wireless device agent 260 applies the instruction to mitigate the detected problem.

For at least some embodiments, the analytics engine 152 provides the instructions to the wireless device agent 260, and further the wireless device agent 260 initiates an action based on the instruction, thereby enabling additional analysis of the problem. That is, the information (user inputs and sensed information) can be used to generate instructions. The instructions can include actions for mitigating the problem, or for providing additional information for diagnosing the problem. That is, mitigating the problem can include an iterative process of analyzing collected and sensed information, taking action, collecting information after taking action, and then preforming further analysis. The result of taking action in a previous iteration is used in the generation of the instructions for problem mitigation in subsequent iterations.

At least some embodiments include the wireless device agent 260 communicating the instruction to a user of the wireless device 120, thereby allowing the user to implement the instruction. Further, for at least some embodiments, the analytics engine provides the instructions to the wireless device agent, and further comprising the wireless device agent 260 communicating an action to be performed by the user, thereby enabling additional analysis of the problem.

In at least some embodiments, the wireless device agent 260 is an application that runs on the end device 120. In at least some embodiments, the wireless device agent 260 runs in a web browser. In at least some embodiments, the wireless device agent 260 is part of device driver in the end device 120. In at least some embodiments, the wireless device agent 260 is part of the operating system of the end device 120.

Figure 3:
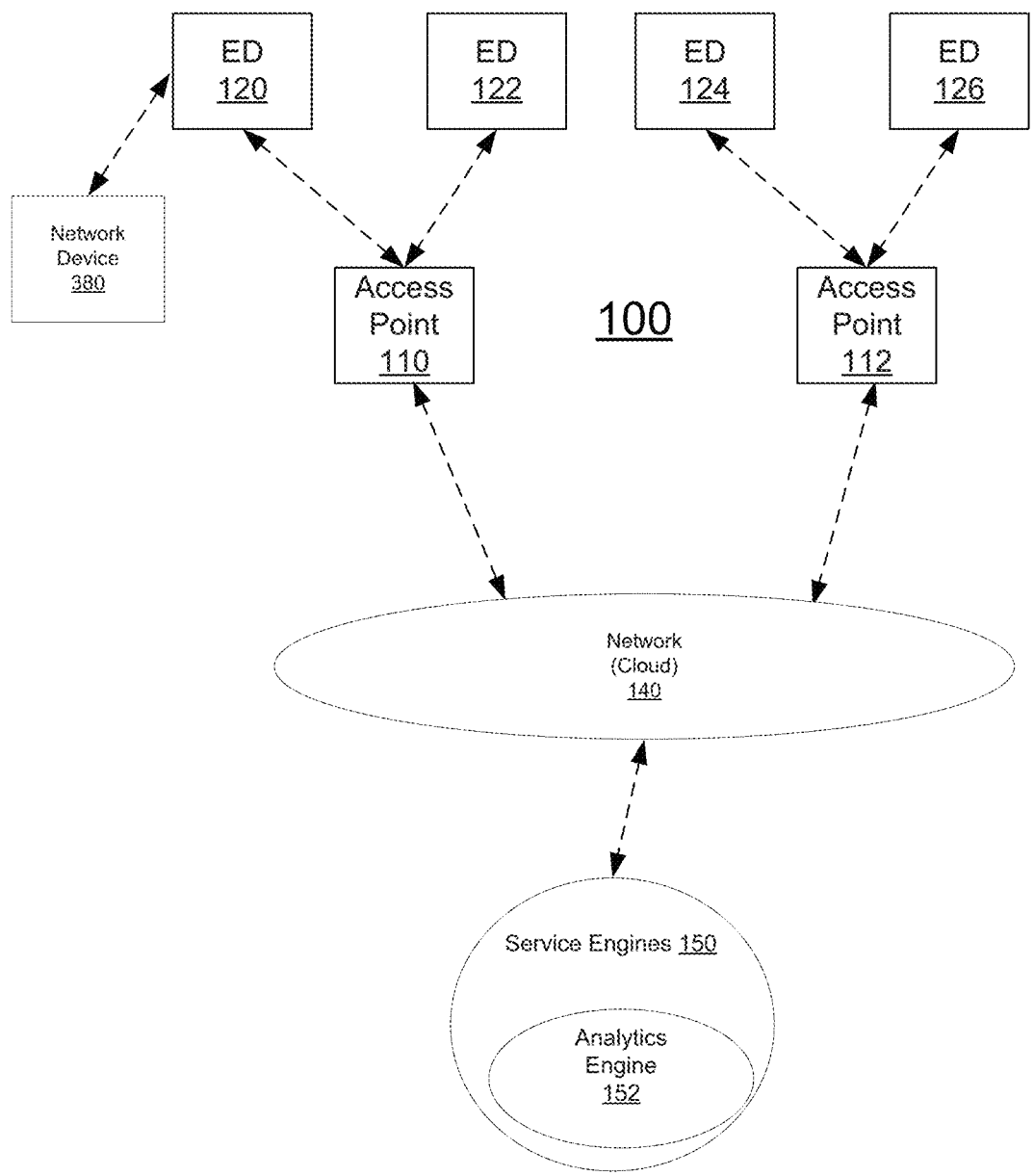
FIG. 3 shows a wireless network that includes an analytic engine and a network device operative to mitigate wireless networking problems, according to an embodiment.

FIG. 3 shows a wireless network that includes an analytic engine 152 and a network device 380 operative to assist mitigation of wireless networking problems, according to an embodiment. For at least some embodiments, the network device includes a separate device that provides additional information that can be used for determining the existence of the problem and for diagnosing the problem. Further, network device can be utilized for mitigating the effects of the problem.

An embodiment includes the analytics engine 152 receiving information from the network device 380. As shown in FIG. 3, the analytics engine 152 receives information from the network device 380 through the wireless device agent. That is, the network device 380 is connected to the end device 120. The end device 120 includes a wireless device agent that communicates the information of the network device 380 to the analytics engine 152 through, for example, the access point 110 and the network 140. That is, for an embodiment, the wireless device agent receives inputs or sense information from the network device 380, which is communicated to the analytics engine 152.

For an embodiment, a network device agent of the network device 380 is operative to interpret commands of a user of the wireless device (ED 120). For an embodiment, the network device agent of the network device 380 is operative to convey information to the user, for example through a display or a visual indicator located on the network device 380.

Figure 4:
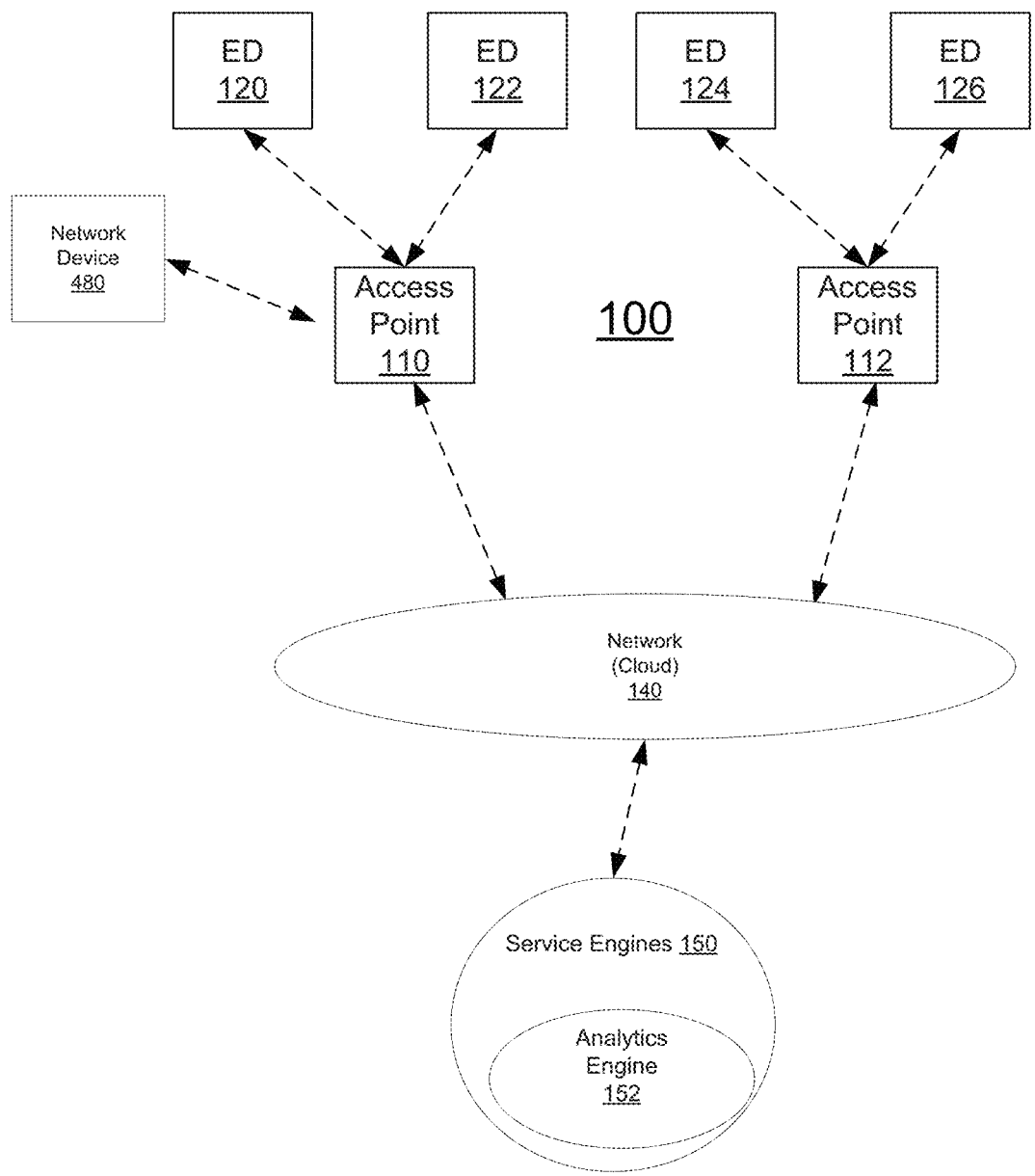
FIG. 4 shows a wireless network that includes an analytic engine and a network device operative to mitigate wireless networking problems, according to another embodiment.

FIG. 4 shows a wireless network that includes an analytic engine 152 and a network device 480 operative to assist mitigation of wireless networking problems, according to another embodiment. While the network device 380 of FIG. 3 communicated with the wireless device agent of the end device 120, the network device 480 communicates directly with the network 140 through, for example, the access point 110.

For an embodiment, the network device 480 is a device that is operative to collect sensor information about the wireless network and transmit the sensor information to the analytics engine 152 for inclusion in the problem signature.

For at least some embodiments, the network device 480 is embedded in existing components of the network, for example access points, access point controllers, routers, or switches.

For an embodiment, the network device 480 is operable to assist in determining whether a determined problem is located between the end device 120 and the access point 110, or between the access point 110 and the network 140. That is, the network device 480 is operable to bisect the problem located between the wireless device (ED 120) and the network 140. That is, is the problem located between the wireless device (ED 120) and the access point 110, or between the access point 110 and the network 140.

For at least some embodiments, the bisection is performed by temporarily providing a secondary channel between the end device 120 and the network 140 via the network device 480. If the secondary channel between the end device 120 and the network 140 is operative, it can be concluded that the original problem is located between the end device 120 and the access point 110, as opposed to between the access point 110 and the network 140. If it is not operative, it can be concluded that the original problem is located between the access point 110 and the network 140.

Figure 5:
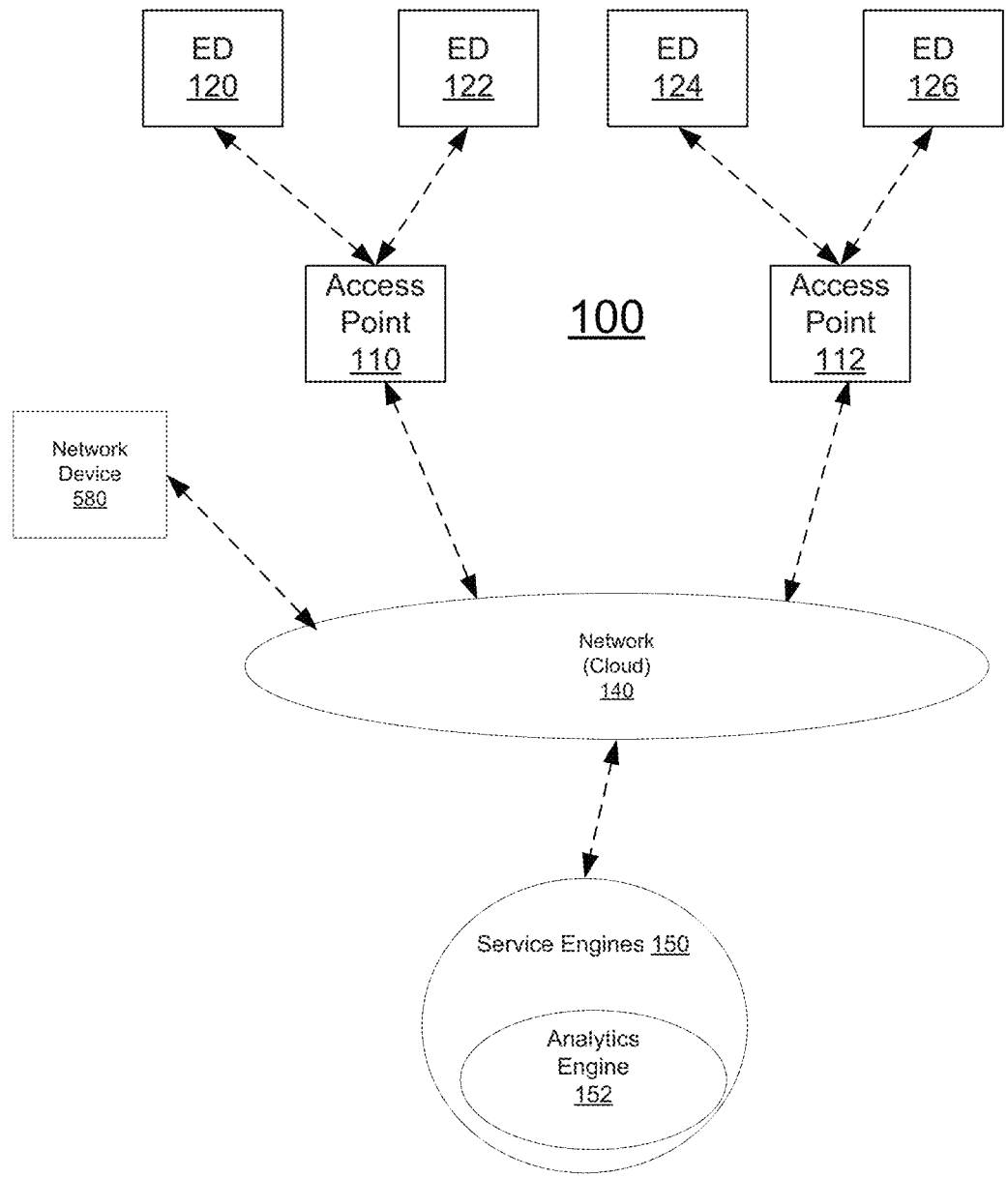
FIG. 5 shows a wireless network that includes an analytic engine and a network device operative to mitigate wireless networking problems, according to another embodiment.

FIG. 5 shows a wireless network that includes an analytic engine 152 and a network device 580 operative to assist in mitigating wireless networking problems, according to another embodiment. An embodiment includes activating a network device agent of the network device 580. For an embodiment, the network device agent of the network device 580 is operative to interpret commands of a user and display information to the user, wherein the user can be a network operator. For an embodiment, a communication channel is established between the network device agent and the analytics engine 152.

For at least some embodiments, the network device agent of the network device 580 is operative to collect the user inputs, select a wireless device from the wireless network based on the previously determined problem in the wireless network, and collect state information that includes information from the wireless device. In an embodiment, the selection is based on one or more of the problem, the structure the wireless network, and other state information. In an embodiment, the wireless device is selected because the wireless device is affected by the problem.

For an embodiment, the state information includes information of the wireless device. For an embodiment, the state information includes information of other devices that are at least one of within a proximate vicinity of the wireless device or includes at least a threshold number of common characteristics. For an embodiment, the state information includes inputs of a user of the wireless device. For an embodiment, the state information includes global knowledge of a Network Operations Center (NOC). For an embodiment, the state information includes inputs collected from a second user. For an embodiment, the state information includes collected network state information from other sources than the wireless device (from other devices in the vicinity, of similar type).

For at least some embodiments, the analytics engine 152 provides the instructions to the network device agent of the network device 580. Further, for an embodiment, the network device agent applies the instruction to mitigate the detected problem. For an embodiment, the network device agent initiates an action based on the instruction, thereby enabling additional analysis of the problem. For an embodiment, the network device agent communicates an action to be performed by the user (network operator), thereby enabling additional analysis of the problem. The result of taking action in a previous iteration will inform the instructions for problem mitigation in subsequent iterations.

While each of the network device 380, 480, 580 is similarly designated as a "network device", it is to be understood that each may operate similarly or differently than the others.

Figure 6:
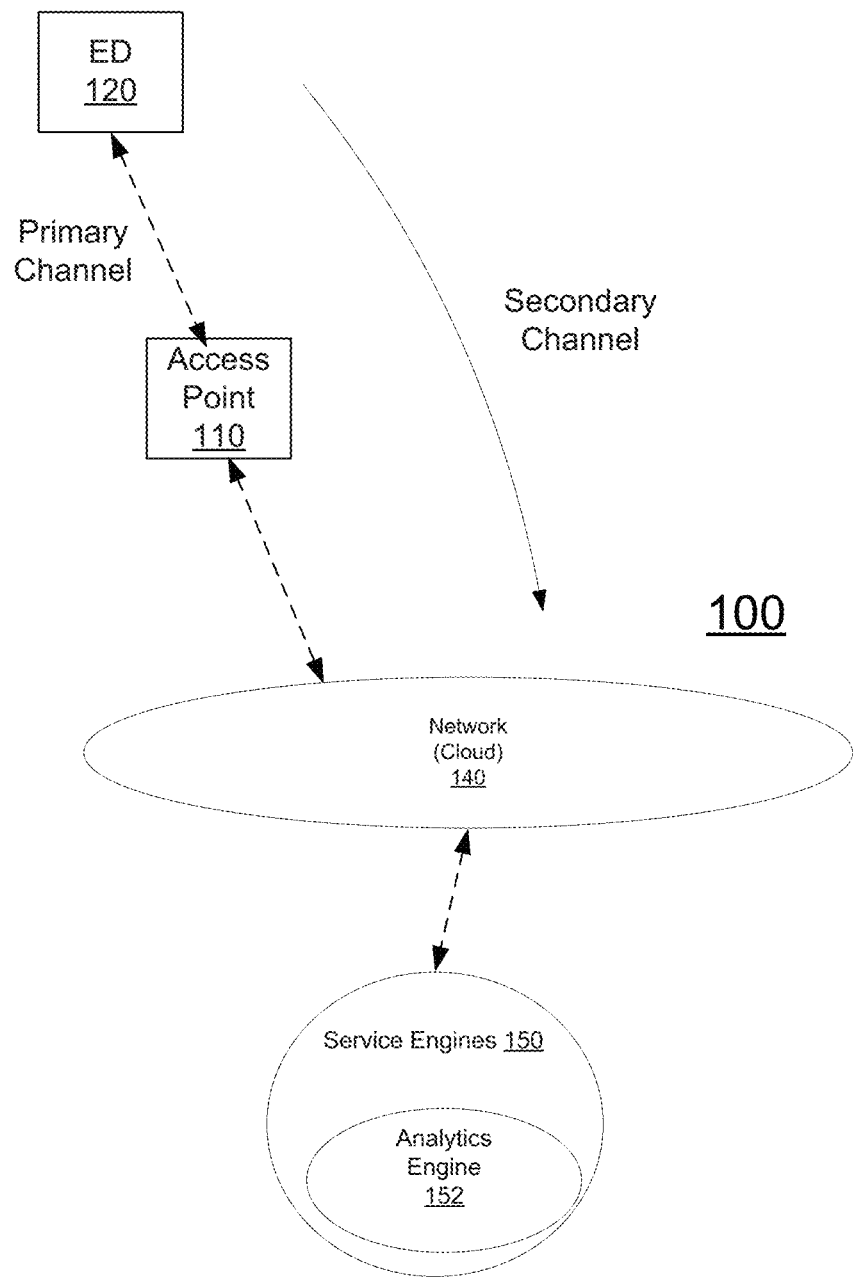
FIG. 6 shows an end device that is interfaced with a network through primary channel and a secondary channel, according to an embodiment.

FIG. 6 shows an end device that is interfaced with a network through primary channel and a secondary channel, according to an embodiment. The secondary channel provides the analytics engine 152 a way to communicate with the wireless device agent if the primary channel is inoperative, compromised, operating below a predetermined threshold, or undesirable for some other reason. For example, the secondary channel can be used by the wireless device agent to indicate to the analytics engine that the wireless device cannot communicate through the primary channel. For an embodiment, the secondary channel is provided by a separate network. More specifically, for an embodiment, the primary channel is provided by a WiFi network, while the secondary channel is provided by a cellular wireless network.

For an embodiment, the primary channel is operative to support an application of the user, while the secondary channel is operative to aid diagnosis of the problem. That is, for example, if the primary channel is currently used for an application that the user is running, a diagnosis function of the analytics engine will use secondary channel so as not to further impair the primary channel.

Figure 7:
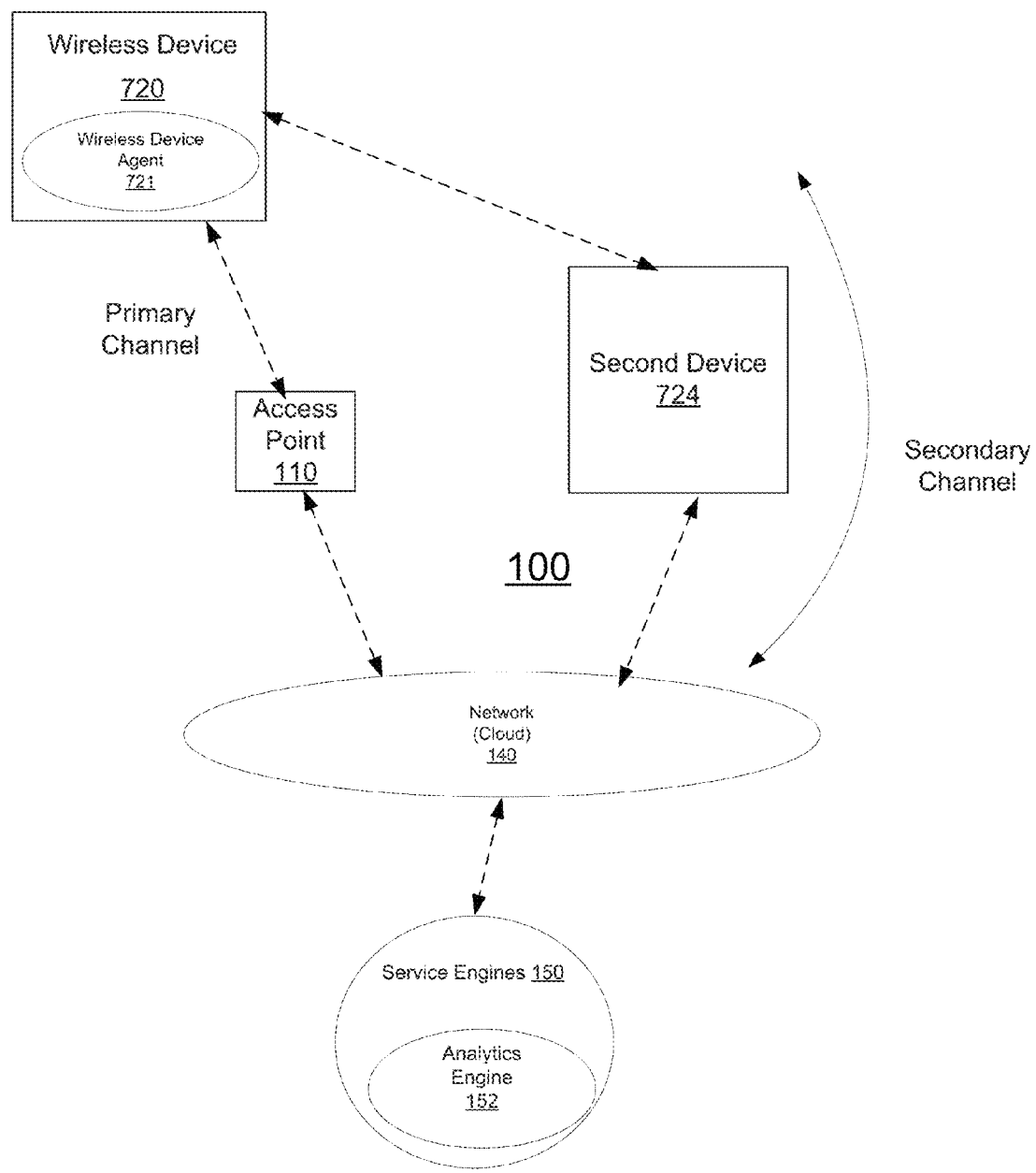
FIG. 7 shows a wireless device that is interfaced with a network through a primary channel, and through a secondary channel provided by a second device, according to an embodiment.

FIG. 7 shows a wireless device 720 that is interfaced with a network 140 through a primary channel, and through a secondary channel provided by a second device 724, according to an embodiment. The embodiment of FIG. 7 is similar to the embodiment of FIG. 6, wherein the second device 724 provides the secondary channel. The wireless device 720 includes a wireless device agent 721 that operative in conjunction with the analytics engine 152 to mitigate the effects of identified wireless networking problems.

Figure 8:
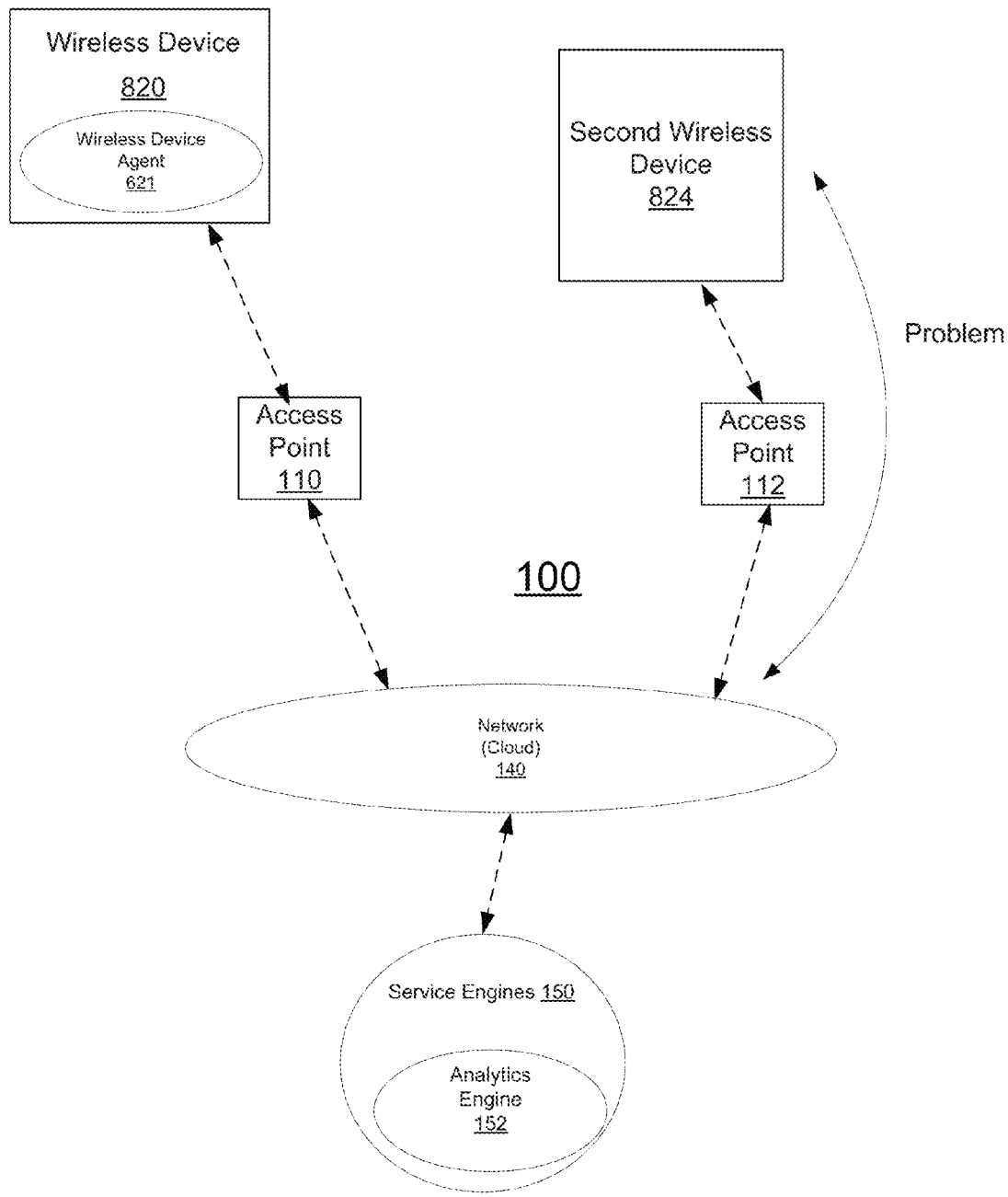
FIG. 8 shows an analytics engine operative to allow a wireless device to facilitate mitigating a wireless network problem of a second wireless device, according to an embodiment.

FIG. 8 shows an analytics engine 152 operative to allow a wireless device 820 to facilitate mitigating a wireless network problem of a second wireless device 824, according to an embodiment. That is, for an embodiment, the problem includes a network problem between the second wireless device 824 and the network 140, and the second wireless device 824 has the problem to be diagnosed, and hopefully mitigated. For example, the second wireless device 824 may include a printer that has a connection problem, and the wireless device 820 is a mobile phone of the user that is being used to diagnose the connection problem of the second device 824 (the printer). For an embodiment, the wireless device 820 is a diagnosis device used by a field technician.

Figure 9:
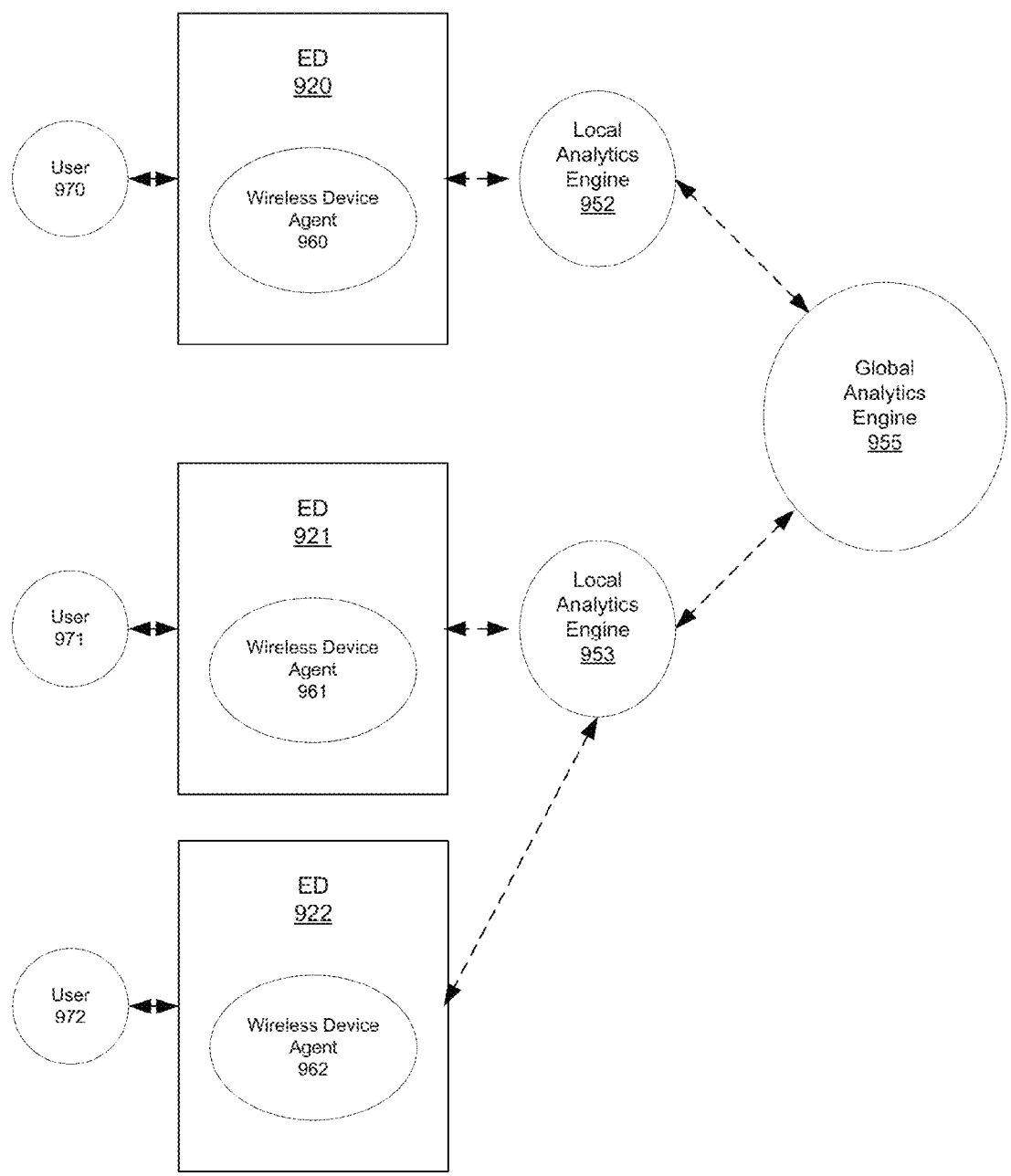
FIG. 9 shows multiple wireless devices that are interfaced with corresponding local analytic engines and a global analytics engine, according to an embodiment.

FIG. 9 shows multiple wireless devices 920, 921, 922 (that include wireless device agents 960, 961, 962) that are interfaced with corresponding local analytic engines 952, 953 and a global analytic engine 955, according to an embodiment. For an embodiment, the local analytics engines 952, 953 are operable to process all of the collected user input (from users 970, 971, 972) and the state information. This information can include sensitive information that user(s) may want control for privacy reasons. As shown, the local analytics engine 953 is operable to server multiple wireless devices 921, 922 and multiple users 971, 972. For example, the local analytics engine 952 may be running on the end device 920 while the local analytics engine 953 may be running on an on-premises computer.

For an embodiment, the global analytics engine 955 is operable to process a subset of the collected user input and the state information. The subset includes, for example, non-secure information, while not including privacy-sensitive information. While the global analytics engine 955 works with a subset of information, the global analytics engine 955 has the benefit of having access to information from multiple sources (from, for example, multiple wireless device agents). Therefore, the global analytics engine 955 can make inferences across different networks. In an embodiment, each local analytics engine 952, 953 is located in a customer's network. For at least some embodiments, the global analytics engine 955 provides inference across customers, wherein a local analytics engine is associated with each of the customers.

For at least some embodiments, the analytics engine includes a plurality of local analytics engines and a global analytics engine, wherein each of the plurality of local analytics engines is operable to process the collected user input and the state information corresponding to its associated devices, and wherein the global analytics engine is operable to process a subset of the collected user input and the state information of each local analytics engine, jointly across all local analytics engines.

FIG. 10 is a flow chart that includes steps of a method of mitigating a problem of a wireless mesh network, according to an embodiment. A first step 1010 includes determining, by an analytics engine, a problem associated with the wireless network, wherein the analytics engine is operative as a central intelligence for detection, analyzing, classifying, root-causing, or controlling the wireless network. A second step 1020 includes receiving, by the analytics engine, a collected user input and state information. A third step 1030 includes mapping, by at least the analytics engine, a problem signature of the user input and the state information to at least one of a number of possible problem network conditions. A fourth step 1040 includes determining, by the analytics engine, instructions for alleviating the problem based on the mapping of the problem signature. A fifth step 1050 includes providing, by the analytics engine, the instructions.

As previously described, for at least some embodiments, the collected user input(s) include, for example, answers to multiple choice questions that relate to the nature of the wireless networking problem, numeric input, or binary input (for example, whether a suggested solution did indeed mitigate the problem).

As previously described, for at least some embodiments, the state information includes the entirety of information available at the analytics engine about the network at a certain point of time. For an embodiment, the state information includes sensor information. For an embodiment, the sensor information includes physical measurements. For an embodiment, the state information includes a protocol state, other things that are not specifically measured, but already present in memory.

As previously described, at least some embodiments further include activating an wireless device agent of a wireless device, wherein a communication channel is established between the wireless device agent and the analytics engine, and wherein the wireless device agent is operative to interpret commands of a user of the wireless device, display information to the user, interface with hardware operations of the wireless device. The wireless device agent is operative to collect the user inputs and at least a portion of the state information of the wireless device.

As previously described, for an embodiment, the analytics engine provides the instructions to the wireless device agent, and further the wireless device agent applies the instruction to mitigate the detected problem. For an embodiment, the agent initiates an action based on the instruction, thereby enabling additional analysis of the problem.

As previously described, for an embodiment, the wireless device agent communicates the instruction to a user of the wireless device, thereby allowing the user to implement the instruction. For an embodiment, the analytics engine provides the instructions to the wireless device agent, and the wireless device agent communicates an action to be performed by the user, thereby enabling additional analysis of the problem.

The instructions can include actions for mitigating the problem, or for providing additional information for diagnosing the problem. That is, mitigating the problem can include an iterative process of analyzing collected and sensed information, taking action, collecting information after taking action, and then preforming further analysis. The result of taking action in a previous iteration is used in the generation of the instructions for problem mitigation in subsequent iterations.

As previously described, for an embodiment, the communication channel includes a primary channel and a secondary channel, and wherein the wireless device agent communicates with the analytics engine through the secondary channel when the primary channel is operating below a predetermined threshold, or undesirable for other reason.

As previously described, for an embodiment, the communication channel includes a primary channel and a secondary channel, wherein the primary channel is operative to support an application of the user, while the secondary channel is operative to aid diagnosis of the problem. For example, the primary channel may be currently used for an application that the user is running, and the diagnosis function of the analytics engine will use secondary channel so as not to further impair the primary channel.

As previously described, for an embodiment, the analytics engine receives information from a network device, and the wireless device agent receives inputs or sense information from the network device. For an embodiment, network device communicates with the wireless device agent only, but not to the analytics engine. For an embodiment, the analytics engine may still receive information from the network device, but only through the wireless device agent. As previously described, the network device can assist in bisecting the problem located between the wireless device and the network. That is, whether the problem located between the wireless device and an access node, or between the access node and the network.

For an embodiment, the network device is operational to provide the communication channel between the wireless device and the analytics engine. That is, the network device acts as a relay for the linking between the wireless device agent and analytics engine. Further, for an embodiment, the network device helps in diagnosing the problem. For example, the network device may be a wireless probe or another access point. Further, for an embodiment, the network device is second device is polled in by the wireless device agent or by the analytic engine.

As previously described, at least some embodiments further include activating a network device agent of a network device, wherein a communication channel is established between the network device agent and the analytics engine, and wherein the network device agent is operative to interpret commands of a user of the network device and display information to the user. Further, these embodiments further include collecting, by the network device agent, the user inputs, selecting a wireless device from the wireless network based on the previously determined problem in the wireless network, and collecting, by the network device agent, at least a portion of the state information that includes information from the wireless device. As previously described, for an embodiment, the selection is based on one or more of the problem, the structure the wireless network, and other state information. In an embodiment, the wireless device is selected because it is affected by the problem.

As previously described, for an embodiment, the state information includes information of the wireless device.

As previously described, for an embodiment, the state information includes information of other devices that are at least one of within a proximate vicinity of the wireless device or includes at least a threshold number of common characteristics.

As previously described, for an embodiment, the state information includes inputs of a user of the wireless device.

As previously described, for an embodiment, the state information includes global knowledge of the NOC.

As previously described, for an embodiment, the analytics engine provides the instructions to the network device agent, and further comprising the network device agent applying the instruction to mitigate the detected problem. For an embodiment, the network device agent initiates an action based on the instruction, thereby enabling additional analysis of the problem. For an embodiment, the network device agent communicates an action to be performed by the user, thereby enabling additional analysis of the problem.

As previously described, for an embodiment the problem includes a network problem between a second wireless device and the network. That is, for example, the second device has the problem to be diagnosed and mitigated. For example, the second wireless device may be a printer that has a connection problem, and the wireless device is a mobile phone of the user that is being used to diagnose the connection problem of the second device (the printer).

As previously described, for an embodiment, the second device receives the instructions from the from the analytics engine.

As previously described, for an embodiment the second device acts as relay for wireless device.

As previously described, for an embodiment the problem signature includes at least one of a wireless device type, a type of access point that the wireless device is connected or attempting to connect to, a network type. For an embodiment, the problem signature includes the wireless network topology. For an embodiment, the problem signature includes configuration data of the access point.

As previously described, for an embodiment the problem signature includes a data traffic type. For an embodiment, the problem signature includes measured data traffic transmission rates.

As previously described, for an embodiment the problem signature includes at least one of a deployment type, or applications that are currently in use in the network. For an embodiment, the problem signature includes a list of applications obtained from end device.

As previously described, for an embodiment mapping the problem signature of the user input and the sensor information with at least one of a number of possible problem network conditions includes comparing features of the problem signature with problem characterizations stored in a knowledge database. As previously described, the term "signature" is to be understood generally as one or more variables (sensed measurements, user inputs) that are related to the problem.

As previously described, for at least some embodiments, the mapping implements an inference, where the nature of the problem is inferred from the problem signature. For an embodiment, the mapping includes applying one or more decision models to the problem signature. For an embodiment, the decision models are constructed based on multiple previously observed problem signatures and the instructions that led to successful mitigation of the problems of the previously observed problem signatures. For an embodiment, the decision models include one or more partitions of the set of possible problem signatures to a finite number of subsets, wherein each of the subsets maps to a particular instruction.

For an embodiment, the one or more partitions are specified by one or more of decision trees, closest neighbor mapping, table lookups, expert systems, probabilistic models of cause and effect.

For an embodiment, the mapping, decision models and/or partitions are constructed from multiple previously observed problem signatures and the instructions that led to their successful mitigation. For an embodiment, the previously observed problem signatures and the instructions that led to their successful mitigation originate from the same wireless network. For another embodiment, the previously observed problem signatures and the instructions that led to their successful mitigation originate from a plurality of wireless networks that includes the same wireless network.

For an embodiment, the mapping, decision models and/or partitions are constructed by an optimization that enhances the probability of successful problem mitigation.

For at least some embodiments, the analytics engine receives second state information from a network device, and wherein matching the problem signature additionally includes matching the second state information received from the network device.

As previously described, for an embodiment the analytics engine includes a local analytics engine and a global analytics engine, wherein the local analytics engine is operable to process all of the collected user input and the state information, and wherein the global analytics engine is operable to process a subset of the collected user input and the state information.

For at least some embodiments, while the global analytics engine works with a subset of information, the global analytics engine has the benefit of having access to information from multiple sources (multiple local analytics engines). Therefore, the global analytics engine can make inferences across different networks. In an embodiment, each local analytics engine is located in a customer's network. For at least some embodiments, the global analytics engine provides inference across customers, wherein a local analytics engine is associated with each of the customers.

As previously described, for at least some embodiments, the analytics engine includes a plurality of local analytics engines and a global analytics engine, wherein each of the plurality of local analytics engines is operable to process the collected user input and the state information corresponding to its associated devices, and wherein the global analytics engine is operable to process a subset of the collected user input and the state information of each local analytics engine, jointly across all local analytics engines.

At least some embodiments for addressing problems in wireless network include sensing a variety of information directly or indirectly related to the wireless network, building comprehensive models of the wireless network, and then exploiting these models to derive anomaly reports, problem diagnosis and recommended changes to network settings. Implemented through automatic control or through man-in-the-loop interventions, these outcomes can be used to improve both user experience and operator costs.

For at least some embodiments, the sensing function is broad and includes wireless sensors that work in-band to the target network, wired sensors that tap data at various end points in the wired segments of network and other sensors such as imaging sensor, occupancy sensor, audio sensor, other radio sensor, light sensor etc. to support comprehensive model building.

For at least some embodiments, the modeling of the wireless network and the related radio environment captures the complex interactions of the elements in the wireless network including path losses, channel condition, as well as the other in-band networks or interferers. Such network models held in databases may also include user locations, user movement, application being used, characteristics of the user device, user presence/location occupancy, user identity and profile etc. For at least some embodiments, the model techniques include multi-category models, lists, if then rules and other techniques, and formats. The modeling function not only depends on internally sensed data but also on data obtained from external databases.

For at least some embodiments, the controlling or output function includes automatic (direct) control of network parameters, or man-in-the-loop interventions including interactive diagnostic support or recommendations to network operators or to end users who can take corrective action. These control or output function are generated by various Service Engines that interact with various entities such as internal data sources/sensors, end devices with associated users, NOC (Network Operations Center) with associated operators, and knowledge databases.

While the modeling function gathers and organizes data to support improvement of user experience or operator costs, such data may also be useful to outside entities or data bases for purposes of coordinating or understanding network or user behavior. Suitable external interface need to be defined for this purpose.

The net result of such a sense-model-control/interact overlay to wireless network is improved user experience and lower operator costs.

DEFINITIONS

For the described embodiments, a network end device or end device is generally defined as a device that terminates a wireless link, and could be a Station/STA or terminal (user end)) or access point or base station or relay node (network end). Further, a station/STA is generally defined as an end device that is associated with a user end of link. An access point (AP) is generally defined as an end device associated with network end of the link. A sensor is generally defined as any device that can sense the environment of a wire or a device. The sensor can be active or passive, and can also be a radio, acoustic, optical, IR etc. Further, the sensor can read data off a wire or register. A wireless sensor is generally defined as a sensor that senses the radio environment to listens to signals, analyses the signals or decode/demodulate the signals.

As mentioned, at least some of the described provide systems, methods and apparatuses for sensing, modeling and controlling a wireless network, providing improved user experience and lower operator costs. At least some of the described embodiments improved abilities to understand and solve connectivity problems such as wireless STA being unable to connect or to re-connect with network. Further, at least some of the described embodiments improved abilities to understand, anticipate and solve performance problems such mutual interference, or interference from non-WiFi devices, poor throughput, poor coverage, etc. Further, at least some of the described embodiments involve improved abilities of wireless end devices to support improved or augmented data collection, sensing and reporting functions. Likewise, at least some of the described embodiments also involve end devices that are augmented to improve performance based on accepting additional control inputs.

Further, at least some of the described embodiments provide interactions with external data entities to aid network modeling or knowledge database development.

Further, at least some of the described embodiments include providing data from the knowledge database or sensor outputs to external entities for improved third party data analytics.

Figure 11:
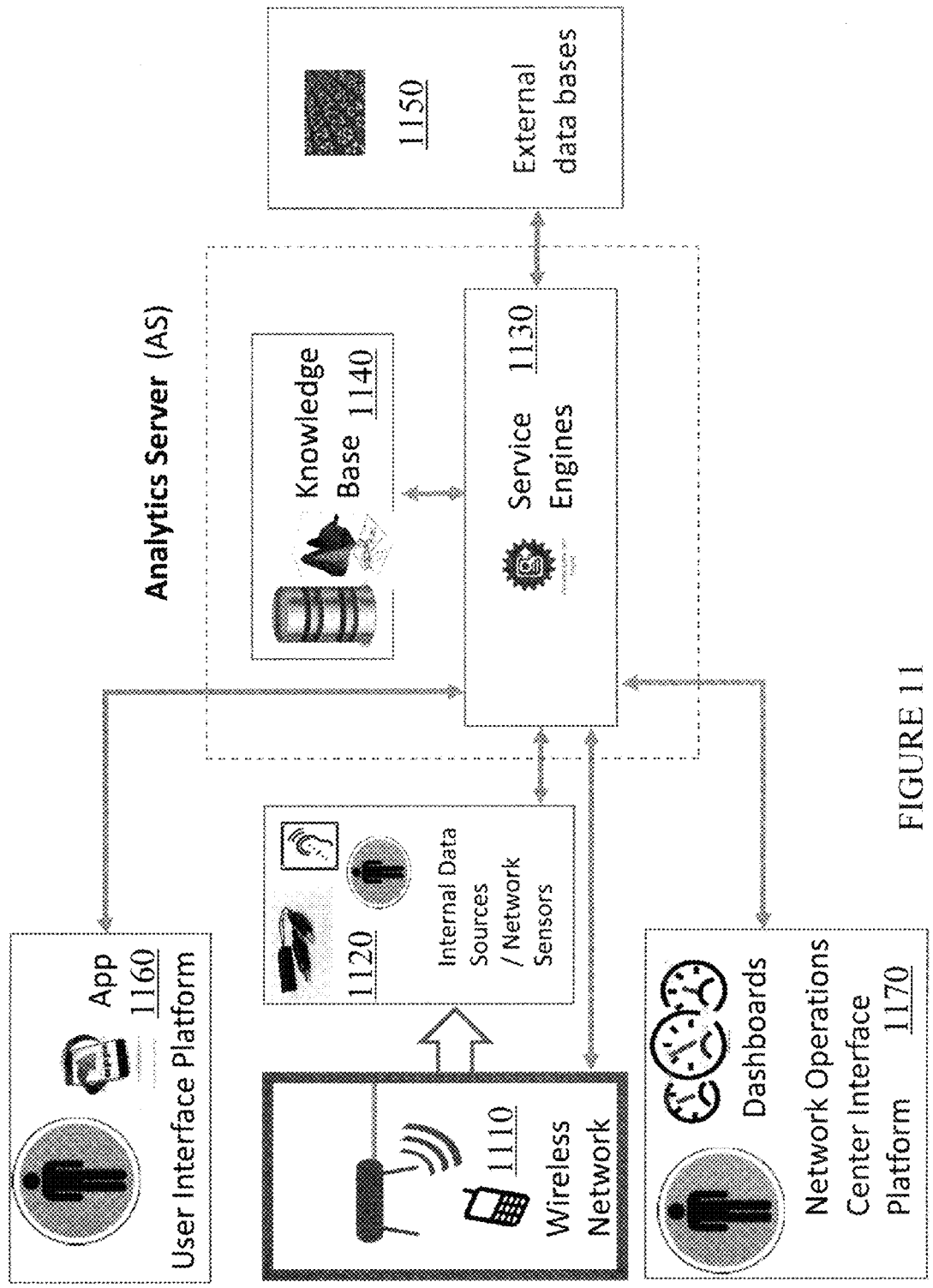
FIG. 11 shows a block diagram of a sense, model and control methodology for improving performance of a wireless network, according to an embodiment.

FIG. 11 shows a block diagram of a sense, model and control system for improving performance of a wireless network 1110, according to an embodiment.

Wireless Network

The wireless network 1110 may be any type of network using wireless radio transmission in any electromagnetic frequency, spanning global area, wide area, local area and personal area. The wireless network 1110 can be long range to very short range. The wireless network 1110 can serve end users or machines (no human user). The wireless network 1110 can involve any wireless standard from Iridium like LEO satellite communications, mobile networks like 3G and 4G, to WiFi networks to Bluetooth and 802.14 networks.

For at least some embodiments, the wireless network 1110 includes STAs and APs. In one embodiment, the wireless network consists of one or more STAs and one or more APs. In another embodiment, the wireless network consists of two or more wireless stations (STAs). The STAs and the APs may include, for example, the previously described access points 110, 112, and/or the previously described end point devices 122, 124, 126.

Network Sensors/Internal Data Sources

FIG. 11 shows internal data sources (including network sensors) 1120 that represent the various network sensors that are the sources of monitoring data about the wireless network 1110. The network sensors 1120 sense the state of the wireless network 1110, which can then be used to model and eventually control the wireless network 1110 to improve user experience and lower operator costs. For at least some embodiments, the network sensors 1120 are, for example, the previously described network devices 380, 480.

For at least some embodiments, the network sensors 1120 include one or more of multiple sensing modalities, such as wireless sensing covering licensed and unlicensed bands; wired network sensors that listen to traffic on the wired segments or read internal registers inside network elements such as routers, controllers, APs, STAs, switches; cameras or imaging devices in multiple spectrum bands, motion detectors, light detectors. Sensing can also extend to humans-inloop providing specific data or inputs on network state or fault condition. The list of possible functions of the network sensors 1120 is not limited.

For at least some embodiments, the network sensors 1120 form their own parallel (overlay) network to the primary wireless network 1110.

For at least some embodiments, the network sensors 1120 include wireless probes or sensors that are placed at different points within the wireless network 1110. For one embodiment, at least a portion of the network wireless sensors 1120 are embedded within one or more APs or one of more STAs For another embodiment, at least a portion of the network sensors 1120 are independent of APs or STAs and may be housed in independent boxes.

For at least some embodiments, network sensors 1120 listen on wired connections as data exit or enter components of the wireless network 1110 such as APs, switch, AP controller, AP manager to extract data from their communication behavior.

For at least some embodiments, network sensors include software agents that run on components of the wireless network 1110 such as APs, switch, AP controller, AP manager to extract data from their internal operation.

For at least some embodiments, the network sensors 1120 are configurable. As previously stated, for at least some embodiments, the network sensors 1120 are controllable by service engine 1130.

As stated, for at least some embodiments, the network sensors 1120 sense conditions of the network 1110. Moreover, for at least some embodiments, the network sensors 1120 include receiving manual (man-in-the-loop) inputs from a user device such as, user interface platform 1160 or NOC interface platform 1170.

For at least some embodiments, the network sensors 1120 receive wireless packets transmitted from one wireless device to another wireless node of the wireless network 1110. That is, the network sensors 1120 include a receiver that is operable to receive wireless packets that are intended for reception by the other wireless node of the wireless network. For an embodiment, the network sensors 1120 passively "over hear" the wireless packets. Characteristics of the overheard wireless packets can be used to characterize performance of the wireless network 1110.

For at least some embodiments, the network sensors 1120 include functionality that allows for more optimal network sensor placement using the sensed data.

Further, at least some embodiments include orchestration of data collection to reduce data bandwidth (to, for example, the knowledge database).

Further, at least some embodiments include real time control of data collection and transmission.

Further, at least some embodiments include multiple levels of probes that accommodate trade-offs between cost and function.

Further, at least some embodiments, the network sensors can act as relays for main network.

Further, at least some embodiments include the network sensors are embedded into powered appliances (such as, Light bulbs, USB charging points, coffee pots)

For at least some embodiments, the data collected by the sensors may be sensitive involving security and or privacy concerns. Therefore the data collection, data transmission and data editing/compression must be employ security policies that are in force or agreed upon.

For at least some embodiments, the network sensors are configured based on a demand basis or anomaly basis.

For at least some embodiments, the multiple network sensors are orchestrated to fuse sensed data and improve the quality of the sensed data.

For at least some embodiments, the sensed data of the multiple network sensors is compressed to reduce bandwidth needed to transmit such data to the sensor service engine and knowledge database.

Service Engines

For at least some embodiments, service engine 1130 refers to a collection of different engines, one each for a specific function. The list of service engines provided is only representative and not limited. For an embodiment, the service engine 1130 includes the service engines 150 and the analytics engine 152.

Sensor Service Engine

For at least some embodiments, the sensor service engine of the service engines 1130 receives data from internal data sources, and for at least some embodiments, provides at least some control over the internal data sources (1120). Further, for at least some embodiments, the sensor service engines both update and store wireless network information in a knowledge database 1140, and as well as accesses previously stored wireless network information to determine what additional sensing is needed or how sensors should be configured.

Further, for at least some embodiments, the sensor service engine process data received from the network sensors 1120.

At least some embodiments include sensor service engines that control data collection, compression, orchestration, configuration of sensors guided by the knowledge database 1140, for example status and anomaly detects reported by an anomaly service engine.

External Service Engine

For an embodiment, an external service engine of the service engines 1130 interacts with external databases 1150 to send data from knowledge database 1140 or from internal data sources 1120. Further, the external service engine fetches data on as needed basis from external data bases and sends them to knowledge database/network modeling entity.

User Service Engine

For an embodiment, a user service engine of the service engines 1130 interacts with the end user with an end device (user interface platform) 1160, and for at least some embodiments, the user service engine interacts with a user via application interfaces running on the user device (user interface platform) 1160. Further, for at least some embodiments, the user service engine provides information to the user device (user interface platform) 1160, and additionally receives information from the user device (user interface platform) 1160. For an embodiment, the user device 1160 is the previously described end point device 120.

Network Operations Center (NOC) Service Engine

For an embodiment, an NOC service engine of the service engines 1130 interacts with the NOC interface platform 1170 that is used by operators to monitor the condition of the wireless network 1100. Further, for at least some embodiments, the NOC service engine interacts with a NOC staff via application interfaces such as dashboards running on the NOC servers. Further, for at least some embodiments, for at least some embodiments, the NOC service engine provides information to the NOC interface platform 1170 and additionally receives information from the NOC interface platform 1170. For an embodiment, the NOC interface platform 1170 is the previously described network device 580.

Control Service Engine

For an embodiment, a control service engine of the service engines 1130 interacts with the network 1110 and the end devices such as APs and STAs as well as controllers and routers to change settings on these devices. For an embodiment, the control service engine is guided by an inference service engine which determines how network settings should be altered.

Anomaly Service Engine

For an embodiment, an anomaly service engine of the service engines 1130 interacts with the other service engines and the knowledge database 1140 to detect network anomalies. The anomaly detection is used by other service engines to take specific actions that result in final diagnosis and solution of the anomaly.

Inference Service Engine

For an embodiment, an inference service engine of the service engines 1130 is triggered by the anomaly detection and it uses the data form the knowledge database and other information from user interface platform 1160, NOC interface platform 1170 and sensor data 1120 to diagnose the network problem as well as find a solution to the anomaly. Solutions may be in terms of recommendations to the user interface platform interface 1160 or NOC interface platform 1170 or direct control of parameters of the network via the control service engine.

Network Models/Knowledge Database

For at least some embodiments, the Network model/knowledge database 1140 includes a repository of all knowledge needed to provide services. For at least some embodiments, the knowledge database 1140 includes different information segments each of which is relevant only to a single wireless network 1110. For at least some embodiments, the knowledge database 1140 contains information segments that are globally relevant and is shared across multiple wireless networks.

For at least some embodiments, the knowledge database 1140 is operable with different formats. Such formats include, for example, relational databases, network, lists, association rules, graphical models, neural networks, decision trees, or probabilistic models.

For at least some embodiments, the knowledge database 1140 includes dynamic (real-time) and/or persistent (historical) data.

For at least some embodiments, the knowledge database 1140 includes different knowledge representations that are unique to WiFi or other specific networks.

For at least some embodiments, the knowledge database 1140 includes black lists and white lists.

For at least some embodiments, the knowledge database 1140 includes geographic (map) representation of data—STA location, inter device interference, Non-WiFi interference maps.

For at least some embodiments, the knowledge database 1140 includes information that is global. That is information obtained from one wireless network is utilized at one or more different wireless networks.

For at least some embodiments, the knowledge database 1140 is integrated with other entities. The other entities include, for example, calendar/event data base, STA location from GPS, home security database (for example, information on whether a user is in or out of house or office).

External Databases

For at least some embodiments, the external databases 1150 include data inputs from third parties. The data input include, for example, end point characteristics, floor plans, AP location, firmware status of STA and APs or routers.

For at least some embodiments, the external databases 1150 are interactive, and include, for example, a query response. For an embodiment, the query response includes sending captured network packets and receiving a classification result as to what application the packets belong to (Netflix, Skype, etc.).

For at least some embodiments, the external databases 1150 include data outputs for third analytics, and include co-ordination with other networks to jointly improve user experience and lower operator costs.

For at least some embodiments, the external databases 1150 is connectable with other entities—calendar/event data base, home security data bases (for example, information on whether a user is in or out of house or office), visit patterns, visit locations.

For at least some embodiments, the external databases 1150 are connectable with external service entities like—what applications is this user using (packet inspection), what are known problems about this device (from MAC address).

User Interface Platform

For an embodiment, the user interface platform 1160 includes a user device wherein an application is running on the user device. For at least some embodiments, the user interface platform 1160 is utilized for improving the performance of the wireless network. For an alternate embodiment, the user interface platform 1160 includes an application running on a separate device, including, for example, a web server, or a network sensor with built-in UI.

For an embodiment, the user interface platform 1160 is utilized as a "man in the loop". Essentially, a human operator (user) of the user device is utilized to monitor, interact and correct network problems. As stated, the user interface 1160 can include the user device (STA), a client and/or an application running on the user device, and/or an application running on a separate device.

For at least some embodiments, the user interface platform 1160 monitors the status of the wireless network and raises alerts to the user service engines 1130.

For at least some embodiments, the user interface platform 1160 changes network settings.

For at least some embodiments, the user interface platform 1160 interacts with service engines 1130 to localize problems.

Network Operations Center (NOC) Interface Platform

For an embodiment, the NOC interface platform 1170 includes an operator that interacts with the NOC services engine to provide the NOC operator with diagnostic information and suggestions for interventions in the network.

For an embodiment, the NOC services engine interacts with the NOC interface platform 1170 through the use of alerts, messages, application interfaces.

At least some embodiments allow the operator to observe status of the multiple wireless networks. Further, for at least some embodiments, the operator at the NOC interface platform 1170 is able to control settings or configurations of the wireless network 1110.

For at least some embodiments, the NOC interface platform 1170 includes displaying, monitoring, interacting and correcting network problems. For an embodiment, the operator (a human) is included within the control loop for solving problems associated with the wireless network 1110.

Figure 12:
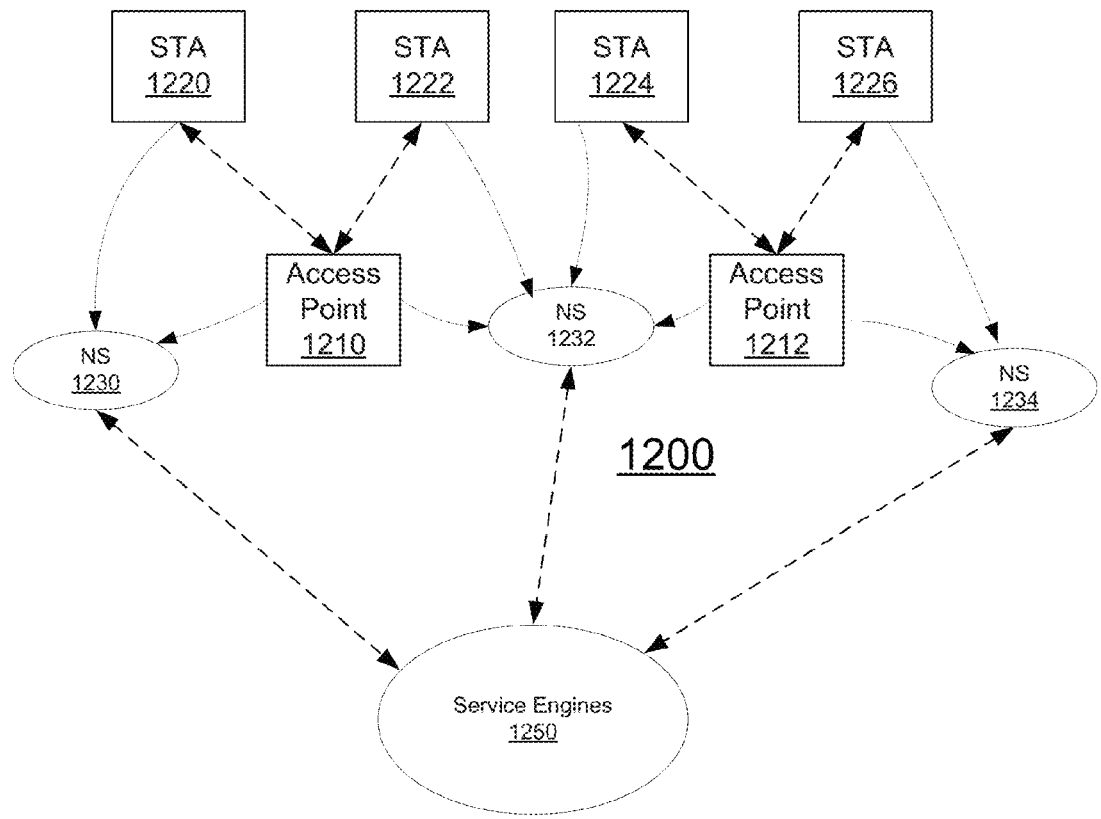
FIG. 12 shows a wireless network that includes multiple wireless sensors, according to an embodiment.

FIG. 12 shows a wireless network 1200 that includes multiple network sensor devices, according to an embodiment. The wireless network 1200 includes multiple wireless network nodes including access points 1210, 1212 (which could be previously described access points 110, 112) and stations (STA) 1220, 1222, 1224, 1226 (which could be previously described end point devices 120, 122, 124, 126).

Further, network sensors 1230, 1232, 1234 (which could be the previously described network devices 380, 480) overlay the wireless network 1200.

The network sensors 1230, 1232, 1234 are operative to sample the state or conditions of the wireless network 1200. While only three network sensors are shown in FIG. 12, it is to be understood that a large number of network sensors may be utilized. Further, with a large number of network sensor continuously sampling conditions of the wireless network 1200, the amount of sample data collected can be substantial. Accordingly, the disclosed embodiments provide for subsampling of the collected data to reduce system requirements, such as, backhaul requirements needed to support the network sensors. For an embodiment, the subsampling maintains only a predetermined percentage of the packets. For an embodiment, the predetermined percentage is 10%.

For an embodiment, the network sensors 1230, 1232, 1234 receive packets transmitted from one wireless device, and intended for another wireless device. That is, for an embodiment, the network sensors 1230, 1232, 1234 form a second network that overlays the wireless network 1200. For example, network sensor 1230 may be physically placed within the wireless network 1200 so that the network sensor 1230 is able to receive packets being transmitted between a user device 1220 and an access point 1210. Further, the network sensor 1232 may be physically placed within the wireless network 1200 that the network sensor 1232 is able to receive packets being transmitted between a user device 1222 and the access point 1210. Network sensor 1232 may similarly receive wireless signals from the user device 1224 and the access point 1212, and network sensor 1234 may receive wireless signals from the user device 1226 and the access point 1212.

As wireless communication between the wireless devices of the wireless network 1200 typically includes large numbers of packets, for at least some embodiments, the network sensor 1230 intelligently determines which of the received packets to retransmit (either wired or wirelessly) to a service engine 1250. Further, in at least some embodiments, the wireless network sensor transmits only a descriptor of the received packet to further reduce backhaul usage. For at least some embodiments, the wireless network sensor transmits a representation of the received packet. For at least some embodiments, the service engine 1250 utilizes the packets, the descriptors of the packets, or the representations of the packets to identify conditions or anomalies of the wireless network for improving user experience and lower operator cost of the wireless network.

Figure 13:
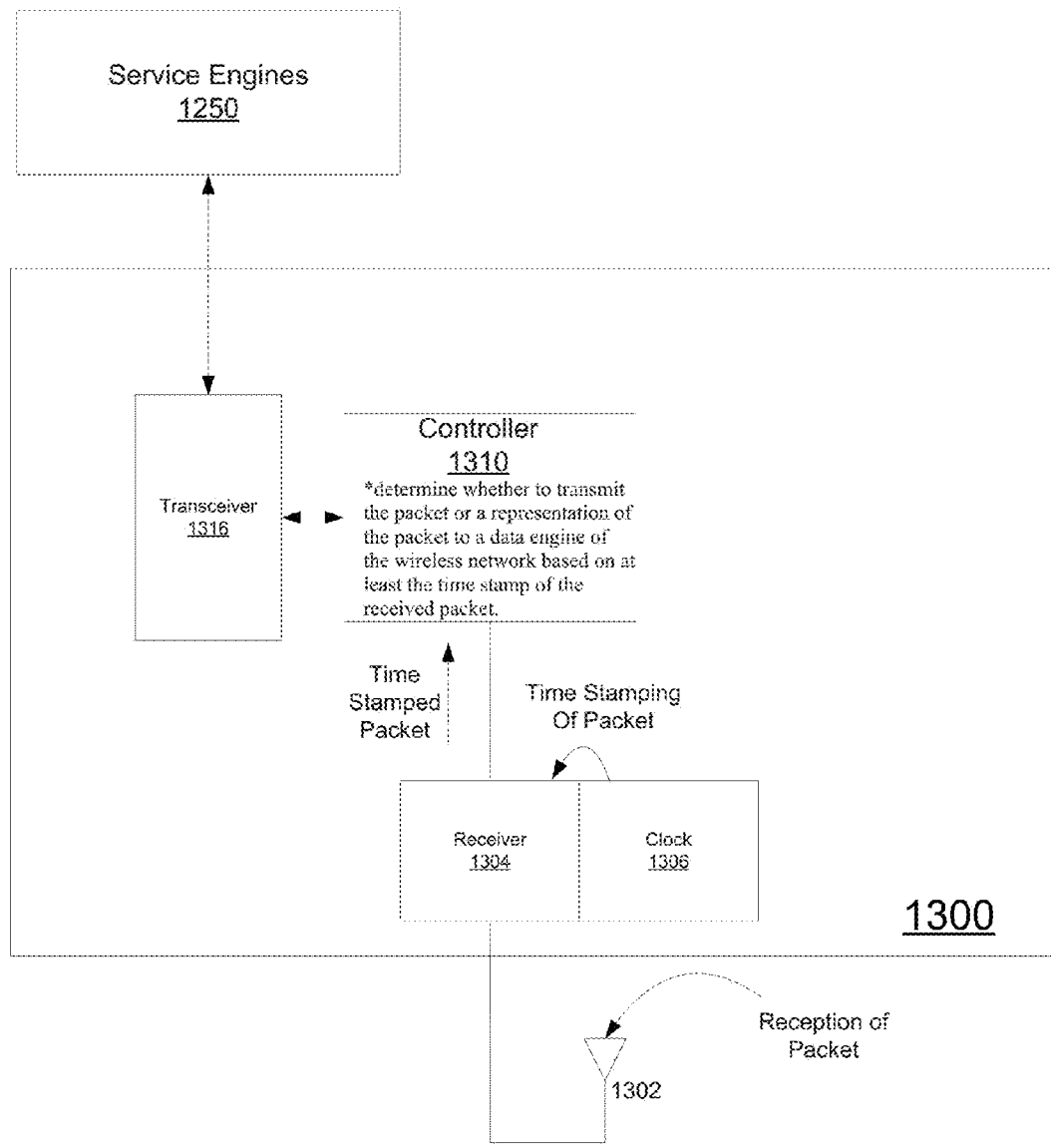
FIG. 13 shows a wireless sensor, according to an embodiment.

FIG. 13 shows a network sensor 1300 (which could be previously describe network devices 380, 480), according to an embodiment. For an embodiment, the network sensor 1300 includes an antenna 1302 and a receiver 1304 for receiving wirelessly transmitted packets. The network sensor 1300 includes a clock 1306 which is used to time-stamp packets as the packets are received by the receiver 1304. For an embodiment, the timestamp is based on the internal clock 1306 of the network sensor.

A controller 1310 of the network sensor 1300 determines if the received packets that have been time-stamped, are to be transmitted by the network sensor 1300 to the service engine 1250. It is to be understood that transmitting the packets to the service engine 1250 includes transmitting at least a representation of the packets. For example, for various embodiments, the representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets. Various parameters can be used to make the determination. Essentially, the network sensor 1300 functions as a gate for determining which of received packets or representation of the packets are further transmitted to the service engine 1250 through, for example, transceiver 1316. The gating provides for orchestration between multiple of similar network sensors. The coordination results in subsampling of the packets, which reduces the impact of the packets on, for example, a backhaul of the network sensors.

For an embodiment, algorithms operating on the controller 1310 within the network sensor attempt to synchronize the internal clock 1306 to internal clocks of other network sensors. For an embodiment, time stamp rules are received by the network sensor 1300 from one or more external devices.

For an embodiment, the time-stamp of a packet is used to aid in the determination of whether to transmit the packet to the service engine 1250.

For an embodiment, an absolute timestamp is determined on real-time clock hardware in the network sensor. For at least some embodiments, algorithms are operable within the network sensor that keeps these timestamps (roughly) synchronized between different sensors. For an embodiment, the rule that is applied to the timestamp is programmed into the sensor by service engine 1250.

For an embodiment, a packet header or packet content of the packet is additionally or alternatively used in the determination of whether to transmit the packet to the service engine 1250.

For an embodiment, an internal state of the network sensor is additionally or alternatively used in the determination of whether to transmit the packet to the service engine 1250. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (for example, packet rates, data rates) over one or more past observation windows.

As stated, the network sensor 1300 selectively transmits packet to the service engine 1250. However, for at least some embodiments, the network server 1300 also receives information from the service engine 1250. The information received from the service engine 1250 can include, for example, rules and control messages. The rules can influence whether a packet is transmitted to the service engine 1250. The control messages can provide control of the network sensor 1300, including, for example, selecting one or more wireless channels for receiver 1304, the receiver bandwidth, selecting the type of data to be recorded, resetting the clock 1314.

Figure 14:
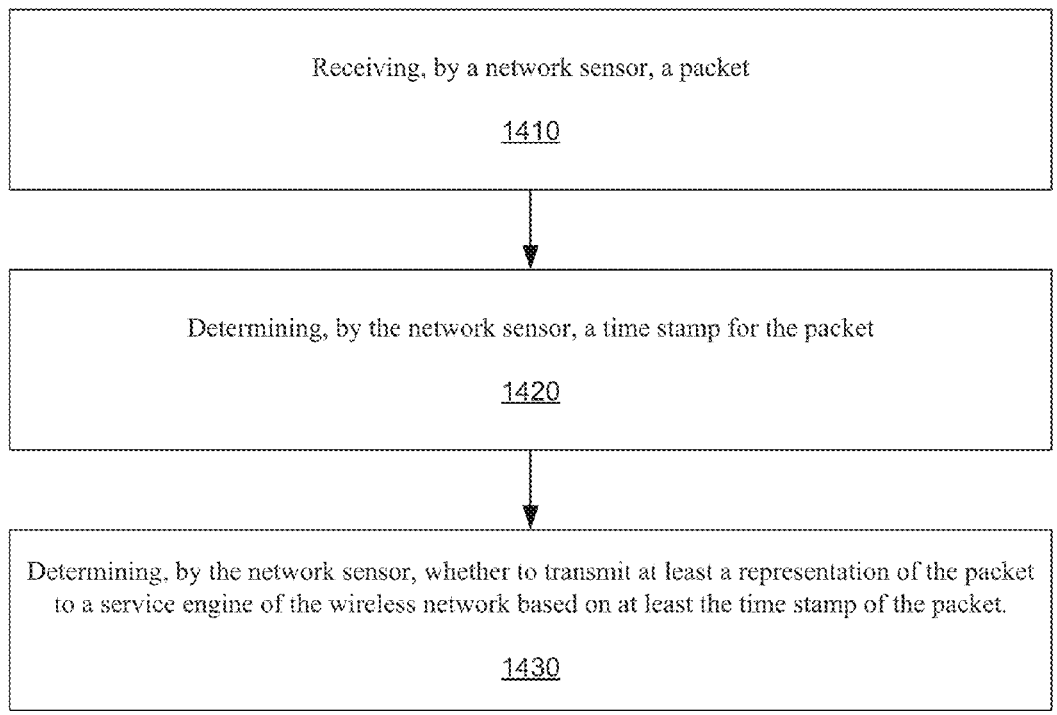
FIG. 14 is a flow chart that includes steps of a method of operating a wireless sensor, according to an embodiment.

FIG. 14 is a flow chart that includes steps of a method of sensing conditions of a wireless network, according to an embodiment. A first step 1410 includes receiving, by a network sensor, a packet. A second step 1420 includes determining, by the network sensor, a time stamp for the packet. A third step 1430 includes determining, by the network sensor, whether to transmit at least a representation of the packet to a service engine of the wireless network based on at least the time stamp of the packet. The network sensors transmits the at least the representation of the packet after determining to transmit the at least the representation of the packet.

For at least some embodiments, the at least a representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets, wherein the representation of multiple packets includes representation of the present packet and representation of other packets.

For at least some embodiments, the packet is a data packet, a management packet, or a control packet.

For at least some embodiments, determining whether to transmit the at least the representation of the packet is additionally or alternatively based on at least one of a packet header or packet content. For at least some embodiments, the packet header information includes one or more of transmit addresses, a destination addresses, packet data rate, packet priority, packet type (management, control, data), packet flags, a packet size, and/or other packet meta information. Further, for at least some embodiments, the packet content information include one or more of transmit and destination IP addresses, higher protocol content (for example, DHCP messages, ARP messages), control message in application-level protocols. For example, flow control messages of the control message may precede data rate changes (for example, Netflix resolution changes, Skype adding another caller etc.). For encrypted packet content, at least some embodiments include the packet content information being surrogated by payload length, or sequencing information.

For at least some embodiments, determining whether to transmit the at least the representation of the packet is additionally or alternatively based on an internal state of the network sensor. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (packet rates, data rates) over one or more past observation windows. For an embodiment, the internal state includes probabilistic data structures that reduce a memory footprint at the cost of slightly reduced decision accuracy (for example, approximate membership tests, such as Bloom filters, quotient filters).

For at least some embodiments, determining whether to transmit the at least the representation of the packet is additionally or alternatively based on an external state of the network sensor, wherein the external state comprises non-wireless observations of the sensor or non-wireless events. This includes, for example, presence detection and/or motion detection (that is, determining whether there are people in the room). For an embodiment, the sensed conditions do not relate to the wireless aspect of the wireless network. For an embodiment, the external state includes sensing non-wireless observations of the network sensor, such as non-wireless events. For an embodiment, this includes additional sensing modalities (motion sensor, temperature sensor, etc.). For an embodiment, the external state includes receiving instruction from a user or operator.

For at least some embodiments, determining whether to transmit the at least the representation of the packet is additionally based on an internal state of the network sensor, and based on at least one of a packet header or packet content.

For at least some embodiments, determining whether to transmit the at least the representation of the packet is additionally based on a decision rule received by the sensor from an external device. That is, the decision or the decision rule is provided to the network sensor from an external source. For example, the service engine provides the decision based on event detection. For example, for an embodiment, the service engine observes and event on at least one of a plurality of sensors, and once observed, the service engine changes the decision rule on another sensors to "zoom in" on this event in more detail. For an embodiment, zooming in includes modifying the decision rule in a way that transmits a larger number of packets or representations of packets.

For at least some embodiments, determining whether to transmit the at least the representation of the packet is additionally based on an at least pseudo randomization rule that results in at least pseudo random transmission of a plurality of packets by the network sensor. For an embodiment, the transmission of the plurality is random. The transmission of the at least the representation of the packet is based on the pseudo randomization rule in that the rule that uses above inputs (timestamp, packet header, packet content, internal state, external state) to make determination of whether to transmit the at least the representation of the packet or not. For at least some embodiments, the at least pseudo randomization rule includes a seed, wherein the seed is received from an external device (for example, service engine).

As previously stated, for an embodiment, the subsampling maintains only a predetermined percentage of the packets. For an embodiment, the predetermined percentage is 10%.

For at least some embodiments, to transmit the at least the representation of the packet is additionally based on a periodic rule that results in periodic transmission of a plurality of packets by the network sensor.

As shown and described, the network sensor is typically used as one of many network sensor of the wireless network. Further, for at least some embodiments, the generation of packets or representations of packets amongst the network sensors is coordinated. That is, for at least some embodiments, each of the plurality of coordination sensors receive a corresponding packet, determine a corresponding time stamp for the corresponding packet, and determine whether to transmit at least a representation of the corresponding packet to the service engine of the wireless network based on at least the time stamp of the received corresponding packet. For an embodiment, corresponding packets mean observations of the same transmitted packet received by different network sensors. The observations can potentially be differently corrupted by the wireless channel. In this embodiment, the plurality of network sensors provides diversity for receiving the same packet.

For at least some embodiments, the plurality of coordinated network sensors are coordinated in their transmission of the at least a representation of the corresponding packet due to the described processes (embodiments) of receiving joint or shared or common, rules, commands, seeds, time synchronization.

For at least some embodiments, the coordination includes each of the multiple network sensors deriving their local timestamps from a common source (for example, the service engine), receiving their rules from common source, or receiving parts of the input for rule from common source (for example, the seed of the pseudorandom function). For at least some embodiments, if the decision rule is purely based on receive timestamp and packet header or content, and the timestamps between each of the plurality of sensors are synchronized, all of the plurality of sensors will make the same decisions on whether to transmit the at least the representation of the packet.

For at least some embodiments, the plurality of coordination network sensors is adaptively selected. For an embodiment, the plurality of coordinated network sensors are adaptively selected based on proximity of the network sensors. For an embodiment, the plurality of network sensor is selected based on an ability of the network sensors to wirelessly communicate with each other. For at least some embodiments, the plurality of network sensors is selected bases on a logical grouping, a tenant, an SSID, and/or a communications channel band.

For an embodiment, determining whether to transmit the at least the representation of the packet includes determining a function of a quantized time of the time stamp, the packet content, and a seed that generates random sampling. When the network sensor is one of many network sensor that are all randomizing (or pseudo random) their packet transmission according to the same rule, the upstream device (such as, the services engine) receives the representation of the packets from the many network sensors. Each packet is either received from all or a subset of the plurality of sensors, or from none at all. For a more specific embodiment, determining whether to transmit the at least the representation of the packet includes determining whether a hash function applied to quantized time of the time stamp, the packet content, and the seed modulo n results in a number no larger than m, wherein the quantized time of the time stamp represents a rounded version of the timestamp, the seed is a pre-agreed number (for example generated from a service engine) amongst a plurality of sensor, and wherein n and m are preselected integers.

The quantized time of the time stamp exists because the timestamp synchronization error between sensors is not below a threshold. For at least some embodiments, a quantization level is chosen given the quality of time synchronization or a threshold error between the plurality of sensors.

For at least some embodiments, the seed, and the integers n and m are chosen by an external device, located, for example, in the cloud (for example a service engine). The integers n and m determine the amount of data reduction (sampling rate). Their values individually do not matter, but together they determine the subsampling rate as their ratio m/n.

For at least some embodiments, determining whether to transmit the at least the representation of the packet is additionally based on a confidence interval of time synchronization between the plurality of coordinated network sensors. For at least some embodiments, multiple network sensors receive a common time synchronization signal from a common source (for example, from a services engine), but due to network delays the synchronization is only to a certain accuracy of +−delta. For an embodiment, the confidence interval is the maximum value that delta can take on.

For an embodiment, determining whether to transmit the at least the representation of the packet includes determining whether a hash function applied to quantized time of the time stamp minus (or plus) the confidence interval, the packet content, and the seed modulo n results in a number no larger than m, and/or whether a hash function applied to quantized time of the time stamp plus the confidence interval, the packet content, and the seed modulo n results in a number no larger than m, wherein the quantized time of the time stamp represents a rounded version of the timestamp, the confidence interval is an upper bound on the time synchronization error, the seed is a pre-agreed number amongst a plurality of sensor (for example received from a service engine), and wherein n and m are preselected integers.

For this embodiment, for a plurality of network sensors, packets transmitted by the plurality of sensors are sub-sampled at a rate higher than m/n. If the timestamps of the plurality of sensors are synchronized to within plus or minus delta time between all the plurality of sensors, all of the plurality of sensors will make the same decisions on whether to transmit the at least the representation of the packet.

For at least some embodiments, the internal state of the network sensor and/or determining whether to transmit the at least the representation of the packet includes determining whether (a) a transmitter address of the packet is different than any transmitter address of any other packet evaluated or received within a last T1 seconds, or (b) the transmitter address of the packet matches a transmitter address of another packet that satisfied (a), within the last T2 seconds.

As previously shown (FIG. 11) and described, at least some embodiments includes a plurality of the described network sensors placed proximate to the wireless network, wherein a service engine receives a plurality of packets from the plurality of network sensors. Further, as described, the service engine(s) identify conditions of the wireless network based on the received plurality of packets. Such conditions include, but are not limited to, network events, network alerts, network anomalies, network performance problems, and/or protocol deadlocks.

FIG. 15 is a flow chart that includes steps of method of estimating qualities of links between devices of a wireless network, according to an embodiment. A first step 1510 includes obtaining, by a service engine, a plurality of link quality signatures, wherein each of the plurality of link quality signatures includes link qualities between a network node and a plurality of network sensors. A second step 1520 includes estimating, by the service engine, link qualities between a plurality of network nodes based on the plurality of link quality signatures and a estimation model.

As previously described, for an embodiment, the plurality of network sensors form an overlay network that overlays an existing wireless network that includes at least the plurality of network nodes. For at least some embodiments, the nodes of the existing wireless network provide limited RF information and/or feedback to service engine or to their own access network. The described embodiments provide augmenting information about these nodes to the wireless network 1110. For at least some embodiments, these nodes provide limited RF information to their own access network and overlay network extracts additional information which can be provided to the wireless network 1110.

For at least some embodiments, the link qualities of the signatures include at least one of RSSI, path loss, MIMO (multiple input, multiple output channel) order, capacity, and/or interference information. For at least some embodiments, the link qualities between a plurality of network nodes includes at least one of RSSI, path loss, MIMO order, modulation schemes, coding schemes, propagation characteristics (LOS, NLOS), capacity, interference information. For an embodiment, the plurality of network nodes includes two network nodes. That is, link qualities are estimated between a pair of nodes based on the plurality of link quality signatures and the estimation model.

At least some embodiments include generating a coverage map by computing (estimating) the link qualities for each Access point and a plurality of access nodes in the coverage map. At least some embodiments include building a graph/map that represents the wireless network by repeating the estimation of link qualities between pluralities of network nodes among many network nodes or locations of the wireless network. For example, the link qualities can be estimated for pairs of nodes within the wireless network. The estimated link qualities can be presented as a graph or map which depicts the link qualities between each of the nodes of the wireless network.

For at least some embodiments, the network service engine obtains a stream of pluralities of link quality signatures. This is, for an embodiment, a continual flow (stream) of link quality signatures are generated over time. For an embodiment, a continual flow (stream) of link quality signatures is generated over space. For an embodiment, a continual flow (stream) of link quality signatures is generated over time and space. For an embodiment, the continual flow (stream) of link quality signatures is received by the service engine. At least some embodiments include averaging multiple of the stream of pluralities of link quality signatures. For an embodiment, the averaging is performed at the network service engine. For an embodiment, the averaging is performed by the network sensors before being received by the service engine. That is, the service engine received a stream of link quality signatures that have been averaged over time.

For at least some embodiments, each signature is based on a single packet received by the plurality of network sensors from the single network node. That is, the single packet was transmitted by the single network node, and received by the plurality of network sensors.

For at least some embodiments, obtaining the plurality of link quality signatures includes receiving a packet descriptor from each of a plurality of network sensors, and comparing the packet descriptors to determine which packets were commonly received from the single network node by multiple of the network sensors. For at least some embodiments, the packet descriptor includes a packet transmitter address. For at least some embodiments, the packet descriptor includes a timestamp of when the packet was received by a network sensor of the plurality of network sensors.

At least some embodiments include determining the estimation model. For an embodiment, this includes characterizing wireless propagation with physical equations. For an embodiment, the determining the estimation model includes characterizing wireless propagation based on training measurements of link quality signatures from a second plurality of network sensors and corresponding training measurements of link quality from a second plurality of network nodes. For an embodiment, the second plurality of network sensors and/or network nodes is used for training the estimation model. In an embodiment the prior measurements are designed such that they cover possible relative locations of network sensors and/or network nodes. In another embodiment, the second plurality of network sensors is identical to the plurality of network sensors being utilized in link quality estimation based on the estimation model.

For an embodiment, the determining the estimation model includes determining the estimation model comprising characterizing wireless propagation with physical equations and characterizing wireless propagation based on prior measurements of link quality signatures and corresponding link quality between nodes. For at least some embodiments, determining the estimation model includes assigning different weights to different cases of the training measurements. For an embodiment, the weights are determined based on a function of the measured link quality between nodes. For example, during construction of the estimation model, cases in which the link quality is low are given additional weighting. Specifically, for example, an objective function used in model optimization is chosen such that errors at low link qualities are penalized more than errors at high link quality. For example, link quality estimation is used to monitor rate control algorithms. The critical cases for these algorithms are when the link quality is below a threshold, hence these cases are weighted more. For an embodiment, the training data is measured in a geometric. For an embodiment, the weights are used to rebalance the training data in order to match it better to the application case, thus (partially) compensating the mismatch.

At least some embodiments include determining the estimation model by modeling network sensor operation before deployment of the network sensors.

For at least some embodiments, an estimation model is precomputed for each of a plurality of different scenarios (for example, office, campus, residential, etc.), and one of the estimation models is selected for each actual deployment. Further, for an embodiment, the estimation model is based on physical equations of wireless propagation. During deployment of the network sensors, the sensor locations are recorded. These sensor locations can be used to determine the sensor distances, which together with the physical equations, can be used to determine the model.

For at least some embodiments, determining the estimation model includes modeling network sensor operation after deployment of the network sensors. Further, for at least some embodiments, the estimation model is initialized before deployment, and adapted to the deployment site based on a set of measurements performed by the plurality of network sensors. Further, for at least some embodiments, the estimation model continually adapts to additional measurements that become available while deployed.

For at least some embodiments, estimating the link qualities between the plurality of network nodes is further based on link quality signatures between the plurality network sensors. For an embodiment, the link quality signatures between the plurality of network sensors is further based on a subset of the plurality of network sensors transmitting packets and other network sensors of the plurality of network sensors receiving and estimating a link quality between the plurality of network sensors. Specifically, for an embodiment, this includes the network sensors determining link strengths between each other by transmitting sounding packets, and supplementing the estimation model with the link strengths determined between the network sensors.

As will be described, for at least some embodiments a processing engine uses sensor-to-sensor link strengths as additional model inputs. That is, along with the plurality of link quality signatures between a network node and a plurality of network sensors, the sensor-to-sensor link strengths are as additional model inputs into the network estimation model.

For an embodiment, the sounding packets are constructed in a way as not to interfere with regular operation of wireless network. For example, for an embodiment, the sounding packets are only transmitted and utilized during periods of low-use of the wireless network, such as at night when a business that utilizes the wireless network is not very active, or active below a threshold level. For an embodiment, the sounding packets are transmitted when activity of the wireless network is sensed to be low or below a threshold. By only transmitting and utilizing the sounding packets during low-use times, the impact of the sounding packets on the network can be minimized.

For at least some embodiments, the link quality signatures between the network sensors are determined upon sensing a motion of one or more of the network nodes of greater than a threshold.

For at least some embodiments, the link quality signatures between the network sensors are determined periodically, wherein periodically could be regularly or within a max period of elapsed time or within a time interval.

At least some embodiments further includes preprocessing each of the plurality of link quality signatures before estimating the link qualities, and estimating the link qualities between the pair of network nodes based on the plurality of preprocessed link quality signatures and the network estimation model. For at least some embodiments, the estimation model is based on one or more of a node type, a node capability, a node transmission power level, a node receiver sensitivity, a node receiver gain, a modulation/coding scheme, or a number of active transmitters.

For at least some embodiments, preprocessing each of the link qualities of each signature of each network sensor includes determining a ratio of the link quality between the network sensor and the network node and a link quality between a selected network sensor and the network node, thereby accounting for variations in transmit power of the network node over time.

Figure 16:
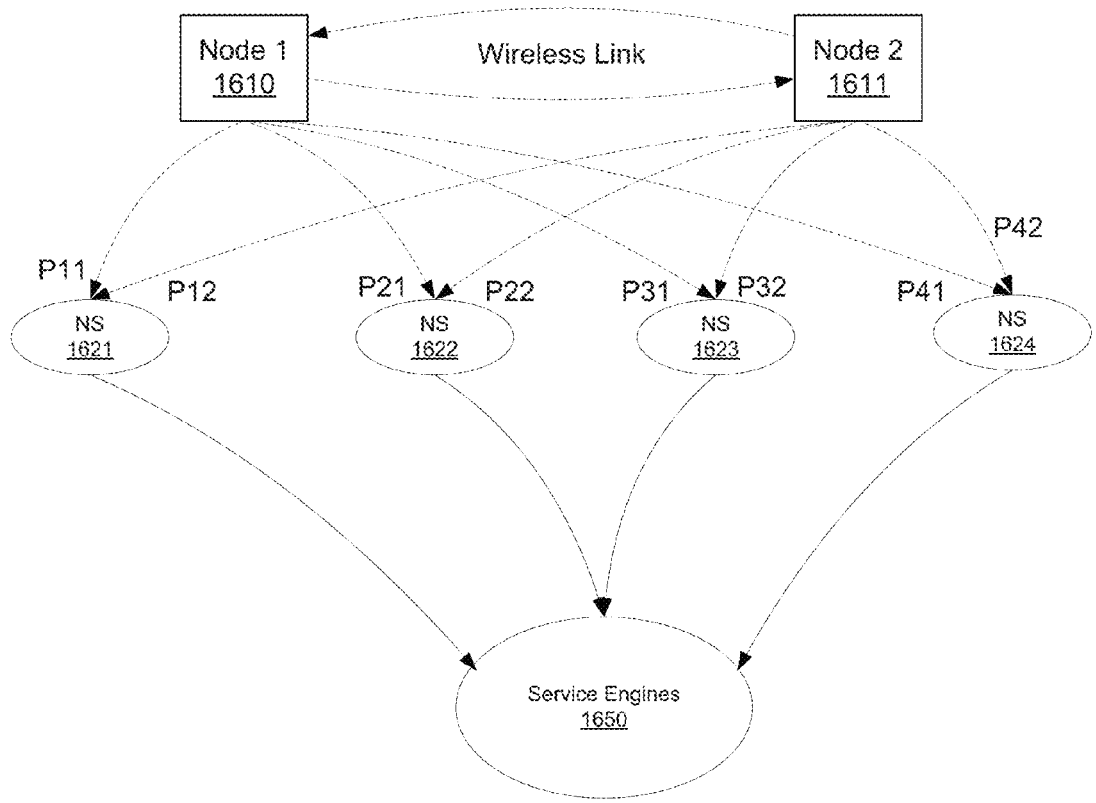
FIG. 16 shows a pair of wireless end devices and wireless sensors, according to an embodiment.

FIG. 16 shows a pair of network nodes 1610, 1620 and network sensors 1621, 1622, 1623, 1624 (for example, the previously described network devices 380, 480), according to an embodiment. The network nodes 1610, 1620 represent two nodes of a wireless network that are communicating with each other. The network sensors 1621, 1622, 1623, 1624 are operable to "overhear" the wireless communication between the network nodes 1610, 1620. Based on the overheard wireless communication, the quality of the wireless link between the wireless access nodes 1610, 1620 is estimated.

For an embodiment, a services engine 1650 receives representations of the wireless signals received by each of the wireless network sensors 1621, 1622, 1623, 1624. As described, for an embodiment, the network service engine 1650 is operable to obtain a plurality of link quality signatures, wherein each signature includes link qualities between a network node (such as, wireless node 1610 or wireless node 1611) and a plurality of network sensors (such as, wireless network sensors 1621, 1622, 1623, 1624), and estimate link qualities between the pair of network nodes (1610, 1611) based on the plurality of link quality signatures and a network estimation model.

Exemplary Steps for Constructing the Estimation Model

For at least some embodiments, the use of the estimation model begins with:

Selecting a Parameterizable model, namely a function $y_{est}=f(x_1, x_2, x_3, \ldots, x_p, c_1, c_2, c_3, \ldots, c_k)$, where f is the estimator function, and $y_{est}$ is the output of the estimator.

For at least some of the embodiments described, the estimated link quality ($y_{est}$) is, for example, between node 1610 and node 1611, and $x_1, x_2, x_3, \ldots, x_p$ are predictor variables (the inputs of the estimator). For at least some of the embodiments described, $x_1, x_2, x_3, \ldots, x_p$ are the link quality signatures for node 1610 and node 1611 (each consisting of link quality numbers as observed by sensors 1621, 1622, 1623, 1624). In other words, p=8 numbers.

For at least some of the described embodiments, these inputs additionally include pairwise link quality signatures between sensors 1621, 1622, 1623, 1624. In other words, an additional 6 numbers for a total of p=14.

Further, $c_1, c_2, c_3, \ldots, c_k$ are parameters of the estimator. For at least some embodiments, the values of these parameters are learned during a training phase.

A training dataset, namely n examples of the form $(y^{(i)}, x_1^{(i)}, x_2^{(i)}, x_3^{(i)}, \ldots, x_p^{(i)})$ for i=1 to n, where $y^{(i)}$ is the link quality between nodes 1610 and 1611 for the ith training example $x_1^{(i)}, x_2^{(i)}, x_3^{(i)}, \ldots, x_p^{(i)}$ are the values of the predictor variables for the ith training example.

Estimation Model Construction (Training):

For at least some embodiments, training of the estimation model includes:

1. First, the parameters of the estimator are initialized, using one of

Set $c_1, c_2, c_3, \ldots, c_k$ to random numbers in a predefined range, or

Set $c_1, c_2, c_3, \ldots, c_k$ to predefined fixed numbers, or

Set $c_1, c_2, c_3, \ldots, c_k$ to numbers derived from the training data set with a predefined computation rule, or Set $c_1, c_2, c_3, \ldots, c_k$ to numbers derived from a physical equations of wireless signal propagation.

2. Next, for j in 1, 2, 3, . . . .

For i in 1, 2, 3, . . . , n, consider example i from the training dataset

Compute estimate $y_{est}^{(i)}=f(x_1^{(i)}, x_2^{(i)}, x_3^{(i)}, \ldots, x_p^{(i)}, c_1, c_2, c_3, \ldots, c_k)$ based on the current parameters of the estimator Compute the current estimation error $e^{(i)}=y^{(i)}-y_{est}^{(i)}$ Based on a predefined rule that depends on the estimate $y_{est}^{(i)}$, the true value $y^{(i)}$, and the current parameters of the estimator $c_1, c_2, c_3, \ldots, c_k$, compute new parameters of the estimator (to reduce the estimation error of the current example)

3. Stop the loop over j in step 2 based on one or more of the following stopping criteria Estimation error $e^{(i)}$, averaged over all n examples in the training set, did not change significantly as compared to the previous run of the loop (previous value of j)

Parameters of the estimator $c_1, c_2, c_3, \ldots, c_k$ did not change significantly as compared to the previous run of the loop (previous value of j)

4. Store the final values of the parameters of the estimator $c_1, c_2, c_3, \ldots, c_k$. They specify the estimation model.

At least some embodiments include variations on the method above:

weighting the training set:

Assign a weight to each example in the training dataset. In the method above, the implicit weight for the ith example is the equal weight $w_i=1/n$. More generally, the weight can be computed based on the true link quality $y^{(i)}$, the predictor values $x_1^{(i)}, x_2^{(i)}, x_3^{(i)}, \ldots, x_p^{(i)}$, or on a combination of the two Instead of visiting all examples i=1, . . . , n in equal proportion (in the inner loop of step 2), visit each example at a frequency proportional to its weight in each loop over j, use a random subset of the training dataset instead of the entire dataset (to save computation)

construct multiple estimation models (with different random starting conditions, or different random subsets of the training set, or different parameterizable estimator function f), and combine the estimates with a combining function ... (there are a lot of variations: online learning, cross-validation, . . . )

Some exemplary specific examples of parameterizable models f:

Neural networks
Support vector regression
Generalized linear models
Regression trees Model Application:

For at least some embodiments, application of the estimation model includes:

1. Picking two nodes between which the wireless link quality is to be estimated;
2. Obtaining values of the predictor variables $x_1, x_2, x_3, \ldots, x_p$ for the chosen nodes;
3. Load parameters of the estimator $c_1, c_2, c_3, \ldots, c_k$ as computed during model construction;
4. Compute the estimated link quality $y_{est}=f(x_1, x_2, x_3, \ldots, x_p, c_1, c_2, c_3, \ldots, c_k)$;
5. Output the estimated link quality $y_{est}$.

The steps can be repeatedly executed;

for the same pair of nodes, if the predictor variables change over time.

for all pairs among a set of at least two nodes, in order to obtain a connectivity graph between the nodes.

Although specific embodiments have been described and illustrated, the embodiments are not to be limited to the specific forms or arrangements of parts so described and illustrated.

What is claimed:

1. A method of mitigating a wireless networking problem of a wireless network, comprising:
    determining, by an analytics engine, a problem associated with the wireless network, wherein the analytics engine is operative as a central intelligence for detection, analyzing, classifying, root-causing, or controlling the wireless network;
    receiving, by the analytics engine, a collected user input and state information;
    mapping, by at least the analytics engine, a problem signature of the user input and the state information to at least one of a number of possible problem network conditions;
    determining, by the analytics engine, instructions for alleviating the problem based on the mapping of the problem signature;
    providing, by the analytics engine, the instructions; and
    wherein the analytics engine comprises a global analytics engine to process a subset of user input and state information collected from a plurality of local analytics engines, the state information corresponding to devices associated with respective local analytics engines.

2. The method of claim 1, further comprising:
    activating a wireless device agent of a wireless device, wherein a communication channel is established between the wireless device agent and the analytics engine, and wherein the wireless device agent is to interpret commands of a user of the wireless device, display information to the user, interface with hardware operations of the wireless device;
    collecting, by the wireless device agent, the user inputs; and
    collecting, by the wireless device agent, at least a portion of the state information of the wireless device.

3. The method of claim 2, wherein the analytics engine provides the instructions to the wireless device agent, and further comprising the wireless device agent applying the instruction to mitigate the detected problem.

4. The method of claim 2, wherein the analytics engine provides the instructions to the wireless device agent, and further comprising the wireless device agent initiating an action based on the instruction, thereby enabling additional analysis of the problem.

5. The method of claim 4, further comprising the wireless device agent communicating the instruction to a user of the wireless device, thereby allowing the user to implement the instruction.

6. The method of claim 2, wherein the analytics engine provides the instructions to the wireless device agent, and further comprising the wireless device agent communicating an action to be performed by the user, thereby enabling additional analysis of the problem.

7. The method of claim 2, wherein the communication channel includes a primary channel and a secondary channel, and wherein the wireless device agent communicates with the analytics engine through the secondary channel when the primary channel is operating below a predetermined threshold.

8. The method of claim 2, wherein the communication channel includes a primary channel and a secondary channel, wherein the primary channel is to support an application of the user, while the secondary channel is to aid diagnosis of the problem.

9. The method of claim 2, further comprising receiving, by the analytics engine, information from a network device, and the wireless device agent receiving inputs or sense information from the network device.

10. The method of claim 2, wherein a network device is operational to provide the communication channel.

11. The method of claim 1, further comprising:
    activating a network device agent of a network device, wherein a communication channel is established between the network device agent and the analytics engine, and wherein the network device agent is to interpret commands of a user of the network device and display information to the user;
    collecting, by the network device agent, the user inputs;
    selecting a wireless device from the wireless network based on the previously determined problem in the wireless network; and
    collecting, by the network device agent, at least a portion of the state information that includes information from the wireless device.

12. The method of claim 11, wherein the state information includes information of other devices that are at least one of within a proximate vicinity of the wireless device or includes at least a threshold number of common characteristics.

13. The method of claim 11, wherein the analytics engine provides the instructions to the network device agent, and further comprising the network device agent applying the instruction to mitigate the detected problem.

14. The method of claim 11, wherein the analytics engine provides the instructions to the network device agent, and further comprising the network device agent initiating an action based on the instruction, thereby enabling additional analysis of the problem.

15. The method of claim 11, wherein the analytics engine provides the instructions to the network device agent, and further comprising the network device agent communicating an action to be performed by the user, thereby enabling additional analysis of the problem.

16. The method of claim 1, wherein determining the problem associated with the wireless network comprises the analytics engine detecting the existence of a problem based on the state information.

17. The method of claim 1, wherein determining the problem associated with the wireless network comprises the analytics engine receiving identification notification of the existence of the problem from a user of a wireless device.

18. The method of claim 2, wherein the problem includes a network problem between a second wireless device and the network.

19. The method of claim 18, wherein the second device receives the instructions from the from the analytics engine.

20. The method of claim 1, wherein the problem signature includes at least one of a wireless device type, a type of access point that the wireless device is connected or attempting to connect to, a network type.

21. The method of claim 1, wherein the problem signature includes a data traffic type.

22. The method of claim 1, wherein the problem signature includes at least one of a deployment type, or applications that are currently in use in the network.

23. The method of claim 1, wherein mapping a problem signature of the user input and the sensor information with at least one of a number of possible problem network conditions includes comparing features of the problem signature with problem characterizations stored in a knowledge database.

24. The method of claim 1, further comprising receiving, by the analytics engine, second state information from a network device, and wherein matching the problem signature additionally includes matching the second state information received from the network device.

25. An analytics engine associated with a wireless network, the analytics engine to:
  determine a problem associated with the wireless network, wherein the analytics engine is operative as a central intelligence for detection, analyzing, classifying, root-causing, or controlling the wireless network;
  receive a collected user input and state information;
  map a problem signature of the user input and the sensor information to at least one of a number of possible problem network conditions;
  determine instructions for alleviating the problem based on the mapping of the problem signature;
  provide the instructions; and
  wherein the analytics engine comprises a global analytics engine to process a subset of user input and state information collected from a plurality of local analytics engines, the state information corresponding to devices associated with respective local analytics engines.

26. A wireless network, comprising:
a plurality of access points;
a plurality of servers associated with the wireless network, wherein one or more of the plurality of servers includes an analytic engine, wherein the analytics engine is operative as a central intelligence for detection, analyzing, classifying, root-causing, and controlling the wireless network, and wherein
the analytics engine is to:
  determine a problem associated with the wireless network, wherein the analytics engine is operative as a central intelligence for detection, analyzing, classifying, root-causing, or controlling the wireless network;
receive a collected user input and state information;
  map a problem signature of the user input and the sensor information to at least one of a number of possible problem network conditions;
  determine instructions for alleviating the problem based on the mapping of the problem signature; and
  provide the instructions;
  wherein the analytics engine comprises a global analytics engine to process a subset of user input and state information collected from a plurality of local analytics engines, the state information corresponding to devices associated with respective local analytics engines.

* * * * *